(12) United States Patent
Sakai et al.

(10) Patent No.: US 11,934,069 B2
(45) Date of Patent: Mar. 19, 2024

(54) OPTICAL ELEMENT AND LIQUID CRYSTAL DISPLAY DEVICE INCLUDING THE SAME

(71) Applicant: Sharp Display Technology Corporation, Kameyama (JP)

(72) Inventors: Akira Sakai, Kameyama (JP); Yuichi Kawahira, Kameyama (JP); Masahiro Hasegawa, Kameyama (JP); Ryosuke Saigusa, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 17/893,313

(22) Filed: Aug. 23, 2022

(65) Prior Publication Data

US 2023/0077158 A1 Mar. 9, 2023

(30) Foreign Application Priority Data

Aug. 31, 2021 (JP) ................................. 2021-141466

(51) Int. Cl.
*G02F 1/13363* (2006.01)
*G02F 1/1335* (2006.01)

(52) U.S. Cl.
CPC .... *G02F 1/13363* (2013.01); *G02F 1/133531* (2021.01); *G02F 1/133536* (2013.01)

(58) Field of Classification Search
CPC ........... G02F 1/133536; G02F 1/13363; G02F 1/133638; G02F 1/133531; G02B 5/3083
See application file for complete search history.

(56) References Cited

U.S. PATENT DOCUMENTS

| 2006/0103782 A1* | 5/2006 | Adachi | G02F 1/1323 349/96 |
| 2010/0231830 A1* | 9/2010 | Hirakata | G02B 5/0242 349/96 |
| 2012/0162581 A1* | 6/2012 | Ashida | G02B 5/3016 349/96 |
| 2020/0096803 A1 | 3/2020 | Saitoh et al. | |

FOREIGN PATENT DOCUMENTS

| JP | 2007-199366 A | 8/2007 |
| JP | 2007-264401 A | 10/2007 |
| JP | 2009-053431 A | 3/2009 |
| JP | 2009053431 A * | 3/2009 |
| JP | 2010-211232 A | 9/2010 |

(Continued)

*Primary Examiner* — Jia X Pan
(74) *Attorney, Agent, or Firm* — Keating & Bennett, LLP

(57) ABSTRACT

An optical element includes, sequentially from a viewing surface side toward a back surface side: a viewing-surface-side polarizer; a retarder; and a back-surface-side polarizer, a transmission axis of the viewing-surface-side polarizer and a transmission axis of the back-surface-side polarizer being parallel to each other, the optical element having an average angle $\theta$ between an angle $\theta 1$ and an angle $\theta 2$ of greater than 0° and smaller than 90°, wherein the angle $\theta 1$ represents an angle formed by an optical axis of the retarder on a surface close to the back surface with the surface close to the back surface; and the angle $\theta 2$ represents an angle formed by an optical axis of the retarder on a surface close to the viewing surface with the surface close to the viewing surface.

17 Claims, 26 Drawing Sheets

(56) References Cited

FOREIGN PATENT DOCUMENTS

| | | | |
|---|---|---|---|
| WO | 2011/030596 A1 | 3/2011 | |
| WO | 2012/090769 A1 | 7/2012 | |
| WO | WO-2012090769 A1 * | 7/2012 | ........... G02B 27/281 |
| WO | 2018/221413 A1 | 12/2018 | |
| WO | 2020/077319 A2 | 4/2020 | |

* cited by examiner

Contrast ratio contour (Luminance)

Contrast ratio contour (Luminance)

FIG.7A

| | Reference Example 1 |
|---|---|
| Cross-sectional view | 1S<br>11 — 1st Polarizer — 0°<br>20 — LC panel — 0°<br>12 — 2nd Polarizer — 90°<br>100S { 30S — Retarder<br>13 — 3rd Polarizer — 90°<br>40 — Backlight |
| Retarder   Thickness d(μm)<br>Average angle θ(°)<br>Angle θ2(°)<br>Angle θ1(°)<br>Retardation R(nm) | 2<br>90<br>90<br>90<br>200 |
| 3rd Polarizer | Reflective polarizer |

FIG.13A

| Example 6 ||
|---|---|
| Cross-sectional view | 11 — 1st Polarizer 0°<br>20 — LC panel 0°<br>12 — 2nd Polarizer 90°<br>100 { 30 — Inclined retarder 90°<br>13 — 3rd Polarizer 90°<br>40 — Backlight |
| Inclined retarder  Thickness d(μm)<br>Average angle θ(°)<br>Angle θ2(°)<br>Angle θ1(°)<br>Retardation R(nm) | 2<br>50<br>10<br>90<br>85 |
| 3rd Polarizer | Reflective polarizer |

FIG.15A

| Example 8 ||
|---|---|
| Cross-sectional view | 11 — 1st Polarizer 0°<br>20 — LC panel 0°<br>12 — 2nd Polarizer 90°<br>100 { 30 — Inclined retarder 90°<br>13 — 3rd Polarizer 90°<br><br>40 — Backlight |
| Inclined retarder  Thickness d(μm)<br>Average angle θ(°)<br>Angle θ2(°)<br>Angle θ1(°)<br>Retardation R(nm) | 2<br>40<br>10<br>70<br>110 |
| 3rd Polarizer | Reflective polarizer |

OPTICAL ELEMENT AND LIQUID CRYSTAL DISPLAY DEVICE INCLUDING THE SAME

CROSS-REFERENCE TO RELATED APPLICATIONS

The present application claims priority under 35 U.S.C. § 119 to Japanese Patent Application No. 2021-141466 filed on Aug. 31, 2021, the contents of which are incorporated herein by reference in their entirety.

BACKGROUND OF THE INVENTION

Field of the Invention

The following disclosure relates to optical elements and liquid crystal display devices including the optical elements.

Description of Related Art

Liquid crystal display devices typically include a liquid crystal panel and a backlight, as well as optical elements such as a polarizing plate and a retarder. Liquid crystal display devices have excellent display characteristics and are therefore widely used for electronic devices such as monitors, projectors, mobile phones, and personal digital assistants (PDAs).

A known technique is to control the viewing angle characteristics of light emitted from a backlight using optical elements such as a polarizing plate and a retarder. Specifically, for example, WO 2012/090769 discloses an optical element including a first polarizer, a birefringent layer, and a second polarizer, wherein the first polarizer, the birefringent layer, and the second polarizer are stacked in the stated order, the transmission axis of the first polarizer and the transmission axis of the second polarizer are parallel to each other, and the biaxiality parameter NZ of the birefringent layer satisfies 10≤NZ or NZ≤−9 and the absolute value |Rth| of the retardation in the thickness direction of the birefringent layer satisfies |Rth|≥200 nm.

BRIEF SUMMARY OF THE INVENTION

Liquid crystal display devices still have room for improvement in the point that they usually have a low contrast ratio (CR) and, in particular, the black color of a dark image is less likely to be recognized as black.

The reasons for this are as follows. FIG. 16 is an image of an example of the transmittance viewing angles of a conventional liquid crystal display device in the black display state. A liquid crystal panel used in a liquid crystal display device includes a polarizing plate having viewing angle dependence. This causes light leakage in an oblique direction as shown in FIG. 16 when the black display state is observed in the oblique direction. In other words, the liquid crystal panel has an insufficient light shutter function in an oblique direction and thus suffers light leakage in the black display state. Part of the light leakage in an oblique direction is scattered by the liquid crystal panel in the direction normal to the liquid crystal panel. This also causes light leakage in the normal direction, reducing the contrast ratio in the front direction.

Automotive liquid crystal display devices require reduction or prevention of a decrease in transmittance (luminance) in the white display at azimuths of 0° to 180° (especially, azimuths of 45° and 135°), which correspond to the viewing angles of watching the liquid crystal display device from above.

WO 2012/090769 discloses a technique of controlling the viewing angle characteristics of light emitted from a backlight using an optical element including a polarizing plate and a retarder, but neither discloses nor suggests any measure against light leakage in an oblique direction. The technique still have room for improvement in terms of reducing or preventing a decrease in contrast ratio in the front direction and reducing or preventing a decrease in transmittance in the white display at azimuths of 0° to 180°.

The present invention has been made under the current situation described above and aims to provide an optical element capable of reducing or preventing a decrease in contrast ratio in the front direction and reducing or preventing a decrease in transmittance in the white display at azimuths of 0° to 180°, and a liquid crystal display device including the optical element.

(1) An embodiment of the present invention is directed to an optical element including, sequentially from a viewing surface side toward a back surface side: a viewing-surface-side polarizer; a retarder; and a back-surface-side polarizer, a transmission axis of the viewing-surface-side polarizer and a transmission axis of the back-surface-side polarizer being parallel to each other, the optical element having an average angle θ between an angle θ1 and an angle θ2 of greater than 0° and smaller than 90°, wherein the angle θ1 represents an angle formed by an optical axis of the retarder on a surface close to the back surface with the surface close to the back surface; and the angle θ2 represents an angle formed by an optical axis of the retarder on a surface close to the viewing surface with the surface close to the viewing surface.

(2) In an embodiment of the present invention, the optical element includes the structure (1), and the average angle θ is not smaller than 40° and not greater than 80°.

(3) In an embodiment of the present invention, the optical element includes the structure (1) or (2), and the angle θ1 is different from the angle θ2.

(4) In an embodiment of the present invention, the optical element includes the structure (1), (2), or (3), and the angle θ1 is greater than the angle θ2.

(5) In an embodiment of the present invention, the optical element includes the structure (1), (2), (3), or (4), and a difference between the angle θ1 and the angle θ2 is not smaller than 60° and not greater than 80°.

(6) In an embodiment of the present invention, the optical element includes the structure (1), (2), (3), (4), or (5), and an azimuth of the optical axis of the retarder on the surface close to the back surface is parallel to an azimuth of the optical axis of the retarder on the surface close to the viewing surface and is perpendicular or parallel to the transmission axis of the viewing-surface-side polarizer.

(7) In an embodiment of the present invention, the optical element includes the structure (1), (2), (3), (4), (5), or (6), and the retarder contains a cured product of polymerizable liquid crystal.

(8) In an embodiment of the present invention, the optical element includes the structure (1), (2), (3), (4), (5), (6), or (7), and the viewing-surface-side polarizer or the back-surface-side polarizer is a reflective polarizer.

(9) Another embodiment of the present invention is directed to a liquid crystal display device including: the optical element according to any of the structures (1), (2), (3), (4), (5), (6), (7), and (8); a liquid crystal panel disposed on a viewing surface side of the viewing-surface-side polarizer of the optical element; and a polarizer disposed on a viewing surface side of the liquid crystal panel.

(10) In an embodiment of the present invention, the liquid crystal display device includes the structure (9), and the optical axis of the retarder on the surface close to the back surface and the optical axis of the retarder on the surface close to the viewing surface each have an azimuth of 90°±3°, provided that an azimuth of 0° is set to the horizontally right direction on a screen of the liquid crystal panel and that the azimuths measure positive in the counterclockwise direction and measure negative in the clockwise direction.

The present invention can provide an optical element capable of reducing or preventing a decrease in contrast ratio in the front direction and reducing or preventing a decrease in transmittance in the white display at azimuths of 0° to 180°, and can provide a liquid crystal display device.

BRIEF DESCRIPTION OF THE DRAWINGS

FIG. 7A is a diagram for illustrating the structure of a liquid crystal display device of Reference Example 1.

FIG. 13A is a diagram for illustrating the structure of a liquid crystal display device of Example 6.

FIG. 15A is a diagram for illustrating the structure of a liquid crystal display device of Example 8.

DETAILED DESCRIPTION OF THE INVENTION

Figure 1:
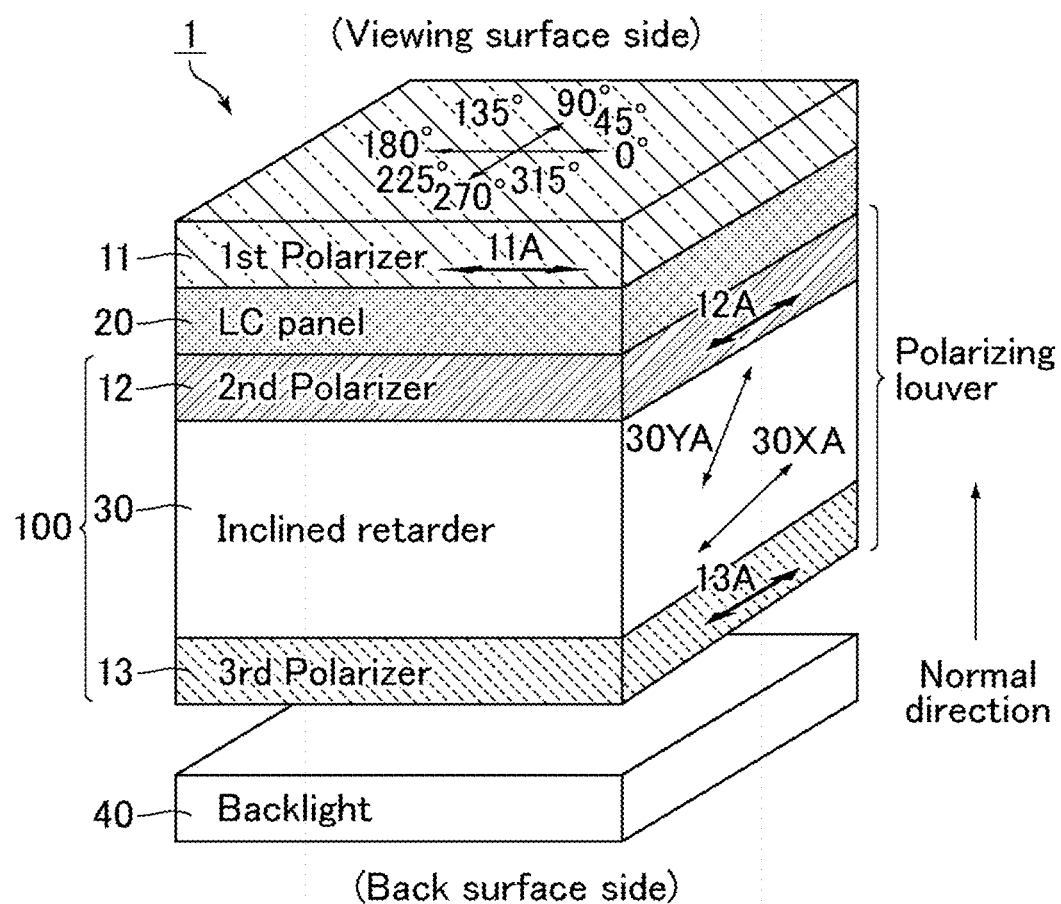
FIG. 1 is a schematic cross-sectional view of an example of the structure of a liquid crystal display device in Embodiment 1.

The present invention is described below in more detail based on embodiments with reference to the drawings. The embodiments, however, are not intended to limit the scope of the present invention.

Definition of Terms

Herein, the "polarizer" means an element that has a function of extracting polarized light vibrating only in a specific direction (linearly polarized light) from unpolarized light (natural light), partially polarized light, or polarized light, and is distinguished from a circular polarizer (a circularly polarizing plate). Unless otherwise noted, the "polarizer" herein does not include any protective film but indicates only an element that has a polarizing function. The "absorptive polarizer" means an element that absorbs light vibrating in a specific direction and transmits polarized light vibrating in the direction perpendicular to the specific direction (linearly polarized light). The "reflective polarizer" means an element that reflects light vibrating in a specific direction and transmits polarized light vibrating in the direction perpendicular to the specific direction (linearly polarized light).

Herein, the "in-plane retardation Rp" is defined by Rp=(ns−nf)d. The "thickness retardation Rth" is defined by Rth=(nz−(nx+ny)/2)d. The symbol ns indicates the greater one of nx and ny, and the symbol nf indicates the smaller one thereof. The symbols nx and ny each indicate the principal refractive index of a birefringent layer (including a retarder and a liquid crystal panel) in an in-plane direction; the symbol nz indicates the principal refractive index in the out-of-plane direction, i.e., the direction perpendicular to the surface of the birefringent layer; and the symbol d indicates the thickness of the birefringent layer.

The optical parameters such as the principal refractive indices and the retardations herein are measured at a wavelength of 550 nm unless otherwise noted.

The "birefringent layer" herein indicates an optically anisotropic layer and conceptually includes a retarder and a liquid crystal panel. The "birefringent layer" means a layer in which one of the in-plane retardation and the absolute value of the thickness retardation is not smaller than 10 nm, preferably not smaller than 20 nm.

The "viewing surface side" herein means the side closer to the screen (display surface) of the liquid crystal display device. The "back surface side" herein means the side farther from the screen (display surface) of the liquid crystal display device.

The "polar angle" herein means an angle formed by a direction in question (e.g., measurement direction) and the direction normal to the screen of the liquid crystal panel. The "azimuth" herein means the direction in question in a view projected onto the screen of the liquid crystal panel and is expressed as an angle (azimuthal angle) formed with the reference azimuth. The reference azimuth (0°) is set to the horizontally right direction on the screen of the liquid crystal panel. The angle and the azimuthal angle measure positive in the counterclockwise direction and measure negative in the clockwise direction. The counterclockwise direction and the clockwise direction are both the rotational directions when the screen of the liquid crystal panel is viewed from the viewing surface side (front). The angle represents a value measured in a plan view of the liquid crystal panel. The expression that two straight lines (including axes, directions, and ridgelines) are "perpendicular to each other" means that they are perpendicular to each other in a plan view of the liquid crystal panel.

Herein, the "axis azimuth" means the azimuth of the absorption axis (reflection axis) of a polarizer or an optical axis (slow axis) of a retarder, unless otherwise noted.

Herein, the expression that two axes are "perpendicular to each other" means that these axes form an angle of 90°±3°, preferably 90°±1°, more preferably 90°±0.5°, particularly preferably 90° (perfectly perpendicular). The expression that two axes are "parallel to each other" means that these axes form an angle of 0°±3°, preferably 0°±1°, more preferably 0°±0.5°, particularly preferably 0° (perfectly parallel).

Hereinafter, embodiments of the present invention are described. The present invention is not limited to the following embodiments, and the design of the present invention may be modified as appropriate within the range satisfying the configuration of the present invention.

Embodiment 1

Figure 2:
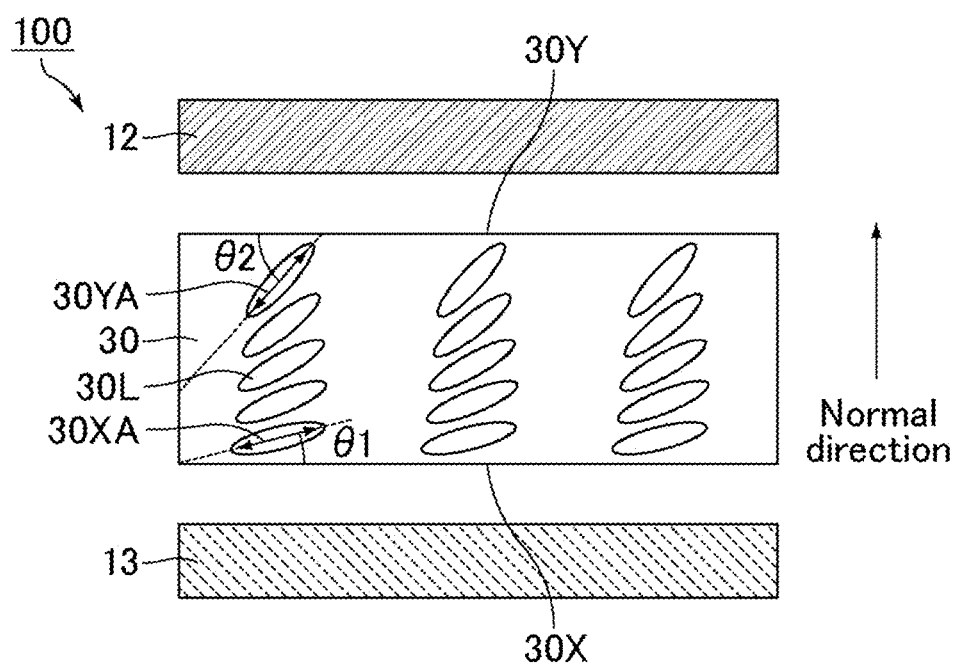
FIG. 2 is a schematic cross-sectional view of a retarder of a polarizing louver in Embodiment 1.

FIG. 1 is a schematic cross-sectional view of an example of the structure of a liquid crystal display device in Embodiment 1. FIG. 2 is a schematic cross-sectional view of a retarder of a polarizing louver in Embodiment 1. A liquid crystal display device 1 of the present embodiment is a transmissive liquid crystal display device and includes, as shown in FIG. 1, sequentially from the viewing surface side to the back surface side, a first polarizer 11, a liquid crystal panel 20 including a liquid crystal layer, a second polarizer 12, which serves as the viewing-surface-side polarizer, a retarder (inclined retarder) 30, a third polarizer 13, which serves as the back-surface-side polarizer, and a backlight 40. The first polarizer 11 corresponds to the polarizer disposed on the viewing surface side of the liquid crystal panel 20.

The components from the second polarizer 12 to the third polarizer 13 collectively function as an optical louver and are therefore also collectively referred to as a polarizing louver. In other words, an optical element including the second polarizer 12, the retarder 30, and the third polarizer 13 is also referred to as a polarizing louver 100.

The first polarizer 11 has a first transmission axis and a first absorption axis or first reflection axis perpendicular to the first transmission axis. The second polarizer 12 has a second transmission axis and a second absorption axis or second reflection axis perpendicular to the second transmission axis. The third polarizer 13 has a third transmission axis and a third absorption axis or third reflection axis perpendicular to the third transmission axis.

As shown in FIG. 1 and FIG. 2, in the polarizing louver 100, the transmission axis of the second polarizer 12 and the transmission axis of the third polarizer 13 are parallel to each other, and the average angle θ between an angle θ1 and an angle θ2 is greater than 0° and smaller than 90°, wherein the angle θ1 represents an angle formed by an optical axis 30XA of the retarder 30 on a surface 30X close to the back surface with the surface 30X close to the back surface; and the angle θ2 represents an angle formed by an optical axis 30YA of the retarder 30 on a surface 30Y close to the viewing surface with the surface 30Y close to the viewing surface. This mode can reduce or prevent a decrease in contrast ratio in the front direction and can reduce or prevent a decrease in transmittance in the white display at azimuths of 0° to 180°. Herein, the optical axis is also referred to as a slow axis.

A retarder having an average angle θ of greater than 0° and smaller than 90° is also referred to as a retarder having an optical axis inclined from the direction normal to the display device (direction normal to the retarder), or an inclined retarder. A retarder having an average angle θ of 90° is also referred to as a retarder having an optical axis corresponding to the direction normal to the display device (direction normal to the retarder). The retarder 30 in the present embodiment is an inclined retarder.

Figure 3:
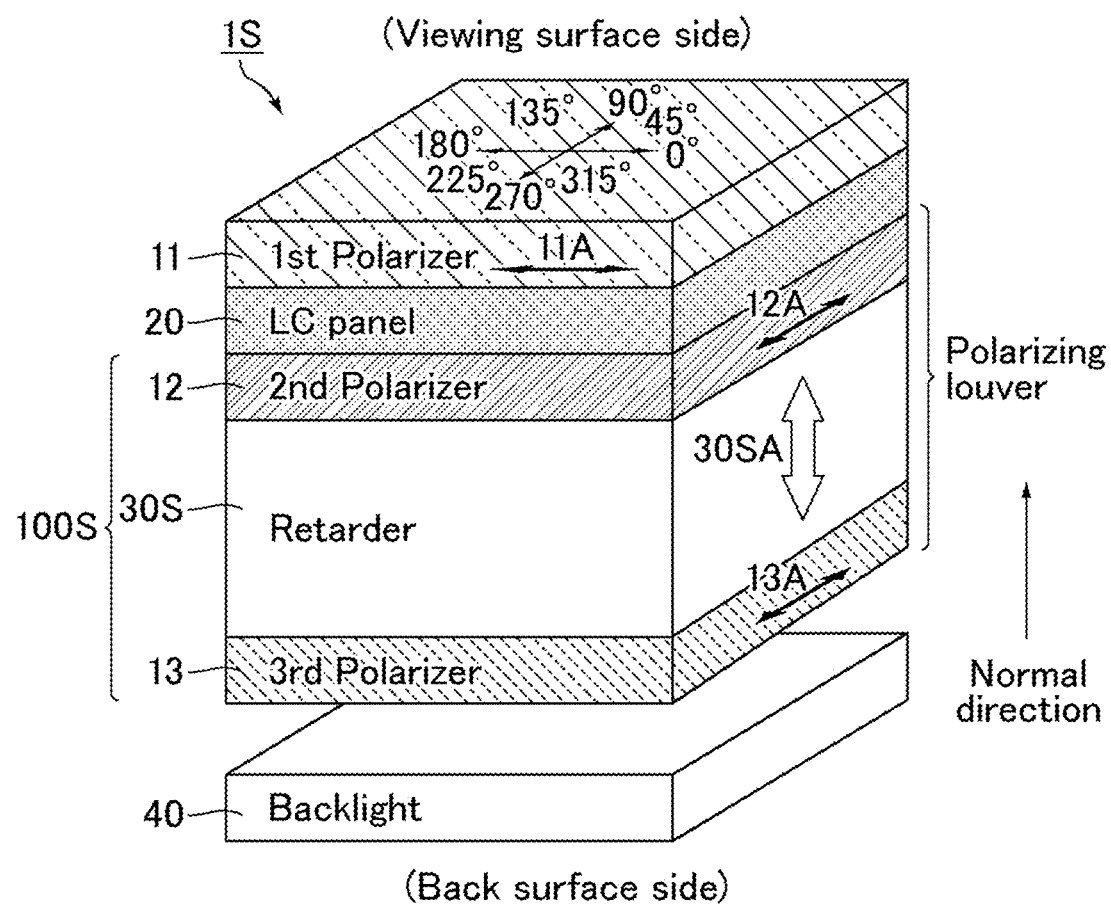
FIG. 3 is a schematic cross-sectional view of an example of the structure of a liquid crystal display device in Reference Embodiment 1.
Figure 4:
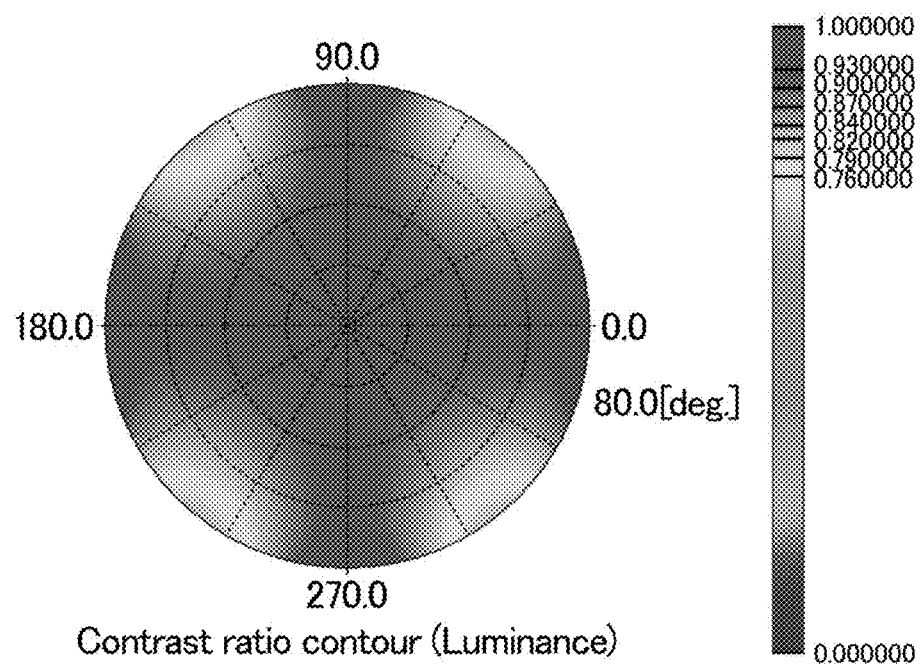
FIG. 4 is a diagram of an example of calculation results obtained by normalizing the transmittance viewing angles of the polarizing louver in Reference Embodiment 1 with the transmittance viewing angles of the polarizing louver including the second polarizer and the third polarizer.

FIG. 3 is a schematic cross-sectional view of an example of the structure of a liquid crystal display device in Reference Embodiment 1. FIG. 4 is a diagram of an example of calculation results obtained by normalizing the transmittance viewing angles of the polarizing louver in Reference Embodiment 1 with the transmittance viewing angles of the polarizing louver including the second polarizer and the third polarizer. As illustrated in a liquid crystal display device 1S of Reference Embodiment 1 in FIG. 3, the present inventors examined a polarizing louver 100S of Reference Embodiment 1 including a retarder 30S having an average angle θ of 90°, i.e., a retarder 30S having an optical axis 30SA (specifically, the principal axis or slow axis of the refractive index ellipsoid) that corresponds to the direction normal to the display device, between the second polarizer 12 and the third polarizer 13.

As a result, the present inventors have found that the polarizing louver 100S of Reference Embodiment 1 restricts the quantity of light incident on the liquid crystal panel 20 from the backlight 40 in an oblique direction. Specifically, as shown in FIG. 4, they have found that the polarizing louver 100S of Reference Embodiment 1 can reduce the quantity of light in oblique directions at azimuths of 45°, 135°, 225°, and 315° in an equally symmetrical manner and can therefore improve the contrast ratio in the front direction. On the other hand, Reference Embodiment 1 involves an issue of dark white display in an oblique direction.

Figure 5:
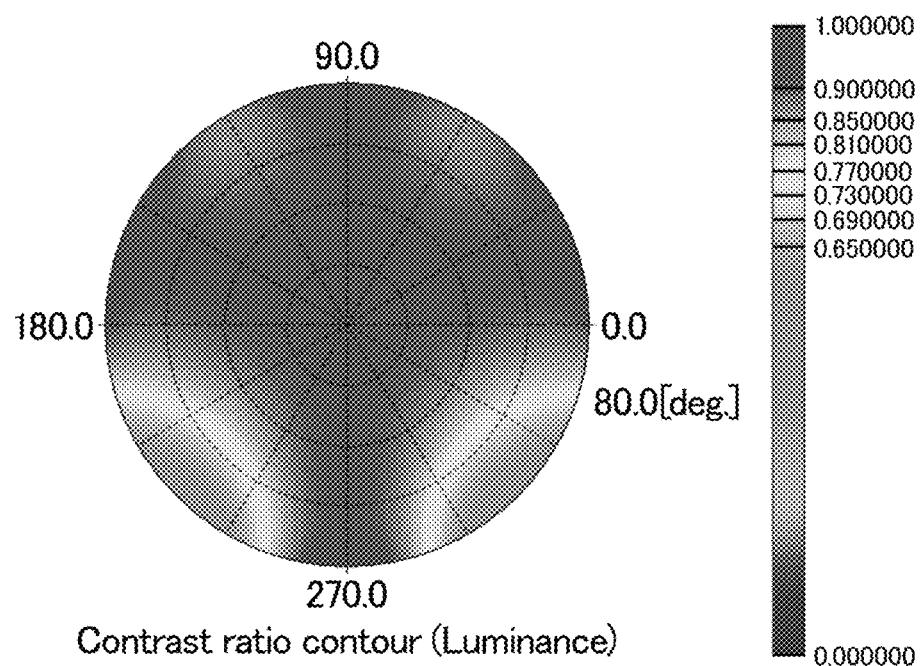
FIG. 5 is a diagram of an example of calculation results obtained by normalizing the transmittance viewing angles of the polarizing louver in Embodiment 1 with the transmittance viewing angles of the polarizing louver including the second polarizer and the third polarizer.
Figure 16:
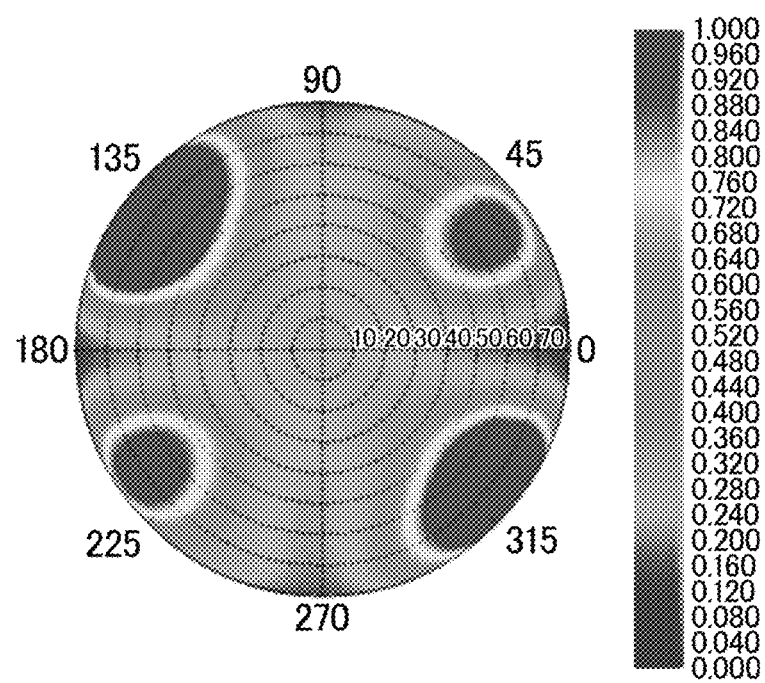
FIG. 16 is an image of an example of the transmittance viewing angles of a conventional liquid crystal display device in a black display state.

FIG. 5 is a diagram of an example of calculation results obtained by normalizing the transmittance viewing angles of the polarizing louver in Embodiment 1 with the transmittance viewing angles of the polarizing louver including the second polarizer and the third polarizer. In the present embodiment, the retarder 30 having an average angle θ of greater than 0° and smaller than 90°, i.e., the retarder 30 having an optical axis inclined from the direction normal to the display device is used to selectively reduce the quantity of light at azimuths of 225° and 315°, thereby solving the above issue. As shown in FIG. 5, the polarizing louver 100 of the present embodiment does not change the quantity of light in the upper part (at azimuths of 0° to 180°) but reduces the quantity of light in the lower part (particularly, at azimuths of 225° and 315°). Thus, it can ensure a sufficient white luminance in the upper part (at azimuths of 0° to 180°), i.e., can reduce or prevent a decrease in transmittance in the white display at azimuths of 0° to 180° while reducing light leakage in the black display and improving the contrast ratio in the front direction. Accordingly, in the present embodiment, light is asymmetrically reduced so that the white luminance viewing angles are improved. For example, the polarizing louver 100 of the present embodiment can reduce or prevent a decrease in transmittance (luminance) in the white display at azimuths of 450 and 135°, which are important in automotive displays. The viewing angle characteristics of the liquid crystal display device 1 of the present embodiment are obtained by multiplying the results in FIG. 16 by the results in FIG. 5.

Hereinafter, the liquid crystal display device 1 is specifically described.

The first polarizer 11 and the second polarizer 12 are arranged in the crossed Nicols. In other words, the first transmission axis (or the first absorption axis or the first reflection axis) of the first polarizer 11 and the second transmission axis (or the second absorption axis or the second reflection axis) of the second polarizer 12 are perpendicular to each other. Specifically, these axes form an angle within the range of 90°±3° (preferably within the range of 90°±1°).

The first polarizer 11 and the second polarizer 12 may be arranged in the parallel Nicols. Still, in order to achieve a high contrast ratio, they are preferably arranged in the crossed Nicols.

The second polarizer 12 and the third polarizer 13 are arranged in the parallel Nicols. In other words, the second transmission axis (or the second absorption axis or the second reflection axis) of the second polarizer 12, which serves as the transmission axis of the viewing-surface-side polarizer, and the third transmission axis (or the third absorption axis or the third reflection axis) of the third polarizer 13, which serves as the transmission axis of the back-surface-side polarizer, are parallel to each other. Specifically, these axes form an angle within the range of 0°±10° (preferably within the range of 0°±50).

The axis azimuths of the second polarizer 12 and the third polarizer 13 may be set as appropriate, and are preferably set to fall within the range of 0°±10° or 90°±10°, more preferably within the range of 0°±5° or 90°±5°, particularly preferably set to substantially 0° or 90°. This structure can provide bright display in the normal direction as well as in the up, down, left, and right directions. For example, the axis azimuth 11A of the first polarizer 11 is 0°, while the axis azimuth 12A of the second polarizer 12 and the axis azimuth 13A of the third polarizer 13 are 90°.

The polarizers 11, 12, and 13 may be formed from any material and may have any optical characteristics. For example, they each may be a polarizer such as an absorptive polarizer or a reflective polarizer. Specific examples of polarizers used as appropriate include an absorptive polarizer obtained by aligning dichroic anisotropic material such as an iodine complex adsorbed on a polyvinyl alcohol (PVA) film, a reflective polarizer obtained by uniaxially stretching a coextruded film including two resins (e.g., APCF available from Nitto Denko Corp. and DBEF available from 3M Japan Ltd.), and a reflective polarizer obtained by aligning thin metal wires in a periodic pattern (i.e., wire grid polarizer). A stack of an absorptive polarizer and a reflective polarizer may also be used.

Preferably, the second polarizer 12 or the third polarizer 13 is a reflective polarizer. The light supplied from the backlight (commonly, unpolarized light) is absorbed and lost by 50% by the absorptive polarizer disposed on the back surface side of the liquid crystal panel. Still, using a reflective polarizer as the second polarizer 12 or the third polarizer 13 can reduce or prevent such absorption of light supplied from the backlight by a polarizer disposed on the back surface side of the liquid crystal panel, improving the light use efficiency. Such a reflective polarizer disposed on the back surface side of the liquid crystal panel is also referred to as a luminance-improving film.

More preferably, the third polarizer 13 is a reflective polarizer. This mode can add a function as a luminance-improving film to the third polarizer 13 of the polarizing louver 100, which can reduce or prevent increases in production cost and thickness of the liquid crystal display device 1.

In the case where the second polarizer 12 is an absorptive polarizer and the third polarizer 13 is a reflective polarizer, the transmission axis of the second polarizer 12 and the transmission axis of the third polarizer 13 are preferably parallel to each other. This mode can more improve the light use efficiency. Specifically, of the light emitted from the backlight 40, polarized light vibrating in the azimuth parallel to the transmission axis of the third polarizer 13, which is a reflective polarizer, passes through the third polarizer 13 and then the second polarizer 12. In contrast, polarized light vibrating in the azimuth perpendicular to the transmission axis of the third polarizer 13 is reflected on the third polarizer 13 back toward the backlight 40. The light returning toward the backlight 40 is then differently polarized by a reflective sheet or diffusion sheet, each of which is to be described later, of the backlight 40 and again emitted from the backlight 40 toward the third polarizer 13. Of these, the polarized light vibrating in the azimuth parallel to the transmission axis of the third polarizer 13 passes through the third polarizer 13 and then the second polarizer 12, while the polarized light vibrating in the azimuth perpendicular to the transmission axis of the third polarizer 13 is again reflected. Repeating this procedure can more improve the light use efficiency.

The first polarizer 11 and the second polarizer 12 are preferably absorptive polarizers and the third polarizer 13 is preferably a reflective polarizer. This mode can reduce or prevent a decrease in contrast ratio while improving the light use efficiency as described above. In this case, the first polarizer 11 has a first transmission axis and a first absorption axis perpendicular to the first transmission axis; the second polarizer 12 has a second transmission axis and a second absorption axis perpendicular to the second transmission axis; and the third polarizer 13 has a third transmission axis and a third reflection axis perpendicular to the third transmission axis.

A plurality of the third polarizers 13 may be prepared and these third polarizers 13 may be used in the form of stack. In this case, the third transmission axes of the third polarizers 13 are set at substantially the same azimuth.

In order to ensure the mechanical strength and the wet and heat resistance, each of the polarizers 11, 12, and 13 may be provided with a protective film (not shown) such as a triacetyl cellulose (TAC) film on at least one of the viewing surface side or the back surface side. The protective film is attached to each of the polarizers 11, 12, and 13 with any appropriate bonding layer (not shown) in between.

The "bonding layer" herein means a layer that bonds adjacent surfaces of components and thereby integrates them with a practically sufficient adhesive force in a practically sufficient bonding time. Examples of material for forming the bonding layer include adhesive and an anchor coating agent. The bonding layer may have a multilayer structure in which an anchor coating layer is present on the surface of a bonding target and an adhesive layer is present thereon. The bonding layer may be a thin layer invisible with the naked eye.

The liquid crystal panel 20 may be of any liquid crystal mode, such as a mode providing black display by aligning liquid crystal molecules in the liquid crystal layer in the direction perpendicular to the substrate surfaces or a mode providing black display by aligning liquid crystal molecules in the liquid crystal layer in the direction parallel to the substrate surfaces or in a direction that is neither parallel nor perpendicular to the substrate surfaces. Examples of the driving mode of the liquid crystal panel include the TFT mode (active matrix mode), the simple matrix mode (passive matrix mode), and the plasma address mode.

Examples of the structure of the liquid crystal panel 20 include: a structure in which a liquid crystal layer is sandwiched between paired substrates including a substrate provided with pixel electrodes and a common electrode, and an image is displayed by applying voltage between the common electrode and the pixel electrodes to generate a transverse electric field (including a fringe electric field) in the liquid crystal layer; and a structure in which a liquid crystal layer is sandwiched between paired substrates including a substrate provided with pixel electrodes and a substrate provided with a common electrode, and an image is displayed by applying voltage between the common electrode and the pixel electrodes to generate a vertical electric field in the liquid crystal layer. Specific examples of the horizontal electric field mode include a fringe field switching (FFS) mode and an in-plane switching (IPS) mode in each of which liquid crystal molecules in the liquid crystal layer are aligned in the direction parallel to the substrate surfaces with no voltage applied. A specific example of the vertical electric field mode is a vertical alignment (VA) mode in which liquid crystal molecules in the liquid crystal layer are aligned in the direction perpendicular to the substrate surfaces with no voltage applied.

The retarder 30 is a retarder having an average angle θ of greater than 0° and smaller than 90°. In other words, the retarder 30 is a retarder having an optical axis inclined from the direction normal to the retarder 30. For example, the retarder 30 is a retarder in which the molecules are aligned in an inclined manner and is also referred to as an oblique plate (O plate).

The average angle θ is preferably not smaller than 40° and not greater than 80°. This mode can ensure a sufficient white luminance in the upper part (azimuths of 0° to 180°), i.e., can reduce or prevent a decrease in transmittance in the white display at azimuths of 0° to 180° while reducing light leakage in the black display and improving the contrast ratio in the front direction. The average angle θ is more preferably not smaller than 450 and not greater than 75°, still more preferably not smaller than 50° and not greater than 70°.

For example, the retarder 30 contains a cured product of polymerizable liquid crystal. The polymerizable liquid crystal is a compound containing a polymerizable group and a mesogen group. Examples of the polymerizable liquid crystal include rod-shaped liquid crystal molecules containing a polymerizable group and disc-shaped liquid crystal molecules containing a polymerizable group. For example, the retarder 30 is obtainable by applying a retarder-forming composition containing polymerizable liquid crystal to an alignment film and curing the polymerizable liquid crystal. Examples of the retarder 30 include a cured layer in which polymerizable liquid crystal 30L is uniformly aligned in an inclined manner and a cured layer in which the polymerizable liquid crystal 30L is aligned in a hybrid arrangement, as shown in FIG. 2. For the polymerizable liquid crystal 30L shown in FIG. 2, at least some of the polymerizable groups are polymerized. The cured layer refers to a layer in which any or all molecules of the liquid crystal composition are crosslinked by heat, catalyst, light, and/or radiation and thereby turned into an insoluble and infusible state or a slightly soluble and slightly fusible state.

The term "hybrid arrangement" herein refers to an arrangement in which the inclination angle (tilt angle) of the polymerizable liquid crystal 30L continuously or intermittently increases or decreases in the thickness direction and the inclination angle of the polymerizable liquid crystal 30L on one surface of the retarder is different from the inclination angle of the polymerizable liquid crystal 30L on the other surface. A typical arrangement of rod-shaped liquid crystal compound molecules in the hybrid arrangement is schematically illustrated in FIG. 2. The tilt angle refers to the angle formed by the physical axis of symmetry of the polymerizable liquid crystal 30L with the interface of the retarder. Specifically, the tilt angle represents the angle formed by the major axis (optical axis) of the polymerizable liquid crystal 30L and the adjacent surface of the layer and is 0° when the polymerizable liquid crystal 30L is aligned parallel in the plane. Since the direction of the major axis of the polymerizable liquid crystal 30L corresponds to the direction of the optical axis, the inclination angle of the polymerizable liquid crystal 30L on one surface of the retarder corresponds to the angle θ1 while the inclination angle of the polymerizable liquid crystal 30L on the other surface corresponds to the angle θ2. In other words, the expression "the inclination angle of the polymerizable liquid crystal 30L on one surface of the retarder is different from the inclination angle of the polymerizable liquid crystal 30L on the other surface" means that the angle θ1 is different from the angle θ2.

For example, the rod-shaped liquid crystal molecule containing a polymerizable group has a structure represented by the following formula (I):

$$Z^1\text{-}Y^1\text{-}A^1\text{-}Y^3\text{-}M\text{-}Y^4\text{-}A^2\text{-}Y^2\text{-}Z^2 \tag{I}$$

wherein $Z^1$ and $Z^2$ each represent a polymerizable group; $Y^1$, $Y^2$, $Y^3$, and $Y^4$ each independently represent a single bond, oxygen, sulfur, —O—CO—, —CO—O—, —O—CO—O—, —CO—NR—, —NR—CO—, —O—CO—NR—, —NR—CO—O—, or —NR—CO—NR—, with at least one of $Y^3$ or $Y^4$ being —O—CO—O—, —O—CO—NR—, —NR—CO—O—, or —NR—CO—NR—; $A^1$ and $A^2$ each independently represent a spacer containing 2 to 30 carbon atoms; M represents a mesogen group; and R represents a C1-C4 alkyl group.

For example, the mesogen group M has a structure represented by the following formula (Ia):

(Ia)

wherein T represents a saturated or unsaturated divalent isocyclic or heterocyclic group; $Y^5$ represents a single bond, oxygen, sulfur, —O—CO—, —CO—O—, —O—CO—O—, —CO—NR—, —NR—CO—, —O—CO—NR—, —NR—CO—O—, —NR—CO—NR—, —O—CH$_2$—, —CH$_2$—O—, —CH=N—, —N=CH—, or —N=N—; and r represents 0, 1, 2, or 3.

In the formula (Ia), when r is greater than 0, Ts may be the same as or different from each other and $Y^5$s may be the same as or different from each other.

For example, the disc-shaped liquid crystal molecule containing a polymerizable group has a structure represented by the following formula (II):

(II)

wherein $Y^{11}$, $Y^{12}$, and $Y^{13}$ each independently represent methine or a nitrogen atom; and $R^{11}$, $R^{12}$, and $R^{13}$ each independently represent the following formula (A), the following formula (B), the following formula (C), or a hydrogen atom, with at least two selected from $R^{11}$, $R^{12}$, and $R^{13}$ being the formula (A), the formula (B), or the formula (C),

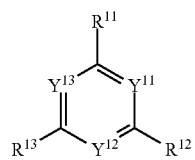

(A)

wherein $A^{11}$ and $A^{12}$ each independently represent a nitrogen atom or methine; $A^{13}$, $A^{14}$, $A^{15}$, and $A^{16}$ each independently represent a nitrogen atom or methine, where the hydrogen atom of methine is optionally replaced by a substituent -$L^{11}$-$L^{12}$-$Q^{11}$; $X^1$ represents an oxygen atom, a sulfur atom, methylene, or imino; $L^{11}$ represents a 5-membered heterocyclic group; $L^{12}$ represents an alkylene or alkenylene group, where one CH$_2$ group or two or more non-adjacent CH$_2$ groups in the alkylene or alkenylene group are each optionally replaced by —O—, —COO—, —OCO—, —OCOO—, —CO—, —S—, —SO$_2$—, —NR$^A$—, —NR$^A$SO$_2$—, or —SO$_2$NR$^A$— (where R$^A$ represents a hydrogen atom or a C1-C4 alkyl group), and where one or two or more hydrogen atoms in these groups are optionally replaced by halogen atoms; and $Q^{11}$s each independently represent a polymerizable group, a hydrogen atom, OH, COOH, or a halogen atom, with at least one $Q^{11}$ being a polymerizable group,

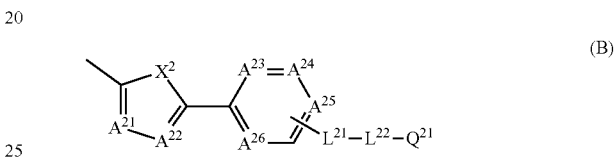

(B)

wherein $A^{21}$ and $A^{22}$ each independently represent a nitrogen atom or methine; $A^{23}$, $A^{24}$, $A^{25}$, and $A^{26}$ each independently represent a nitrogen atom or methine, where the hydrogen atom of methine is optionally replaced by a substituent -$L^{21}$-$L^{22}$-$Q^{21}$; $X^2$ represents an oxygen atom, a sulfur atom, methylene, or imino; $L^{21}$ represents a 5-membered heterocyclic group; $L^{22}$ represents an alkylene or alkenylene group, where one CH$_2$ group or two or more non-adjacent CH$_2$ groups in the alkylene or alkenylene group are each optionally replaced by —O—, —COO—, —OCO—, —OCOO—, —CO—, —S—, —SO$_2$—, —NR$^B$—, —NR$^B$SO$_2$—, or —SO$_2$NR$^B$— (where R$^B$ represents a hydrogen atom or a C1-C4 alkyl group), and where one or two or more hydrogen atoms in these groups are optionally replaced by halogen atoms; and $Q^{21}$s each independently represent a polymerizable group, a hydrogen atom, OH, COOH, or a halogen atom, with at least one $Q^{21}$ being a polymerizable group,

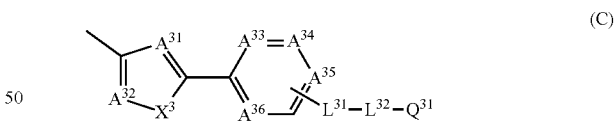

(C)

wherein $A^{31}$ and $A^{32}$ each independently represent a nitrogen atom or methine; $A^{33}$, $A^{34}$, $A^{35}$, and $A^{36}$ each independently represent a nitrogen atom or methine, where the hydrogen atom of methine is optionally replaced by a substituent -$L^{31}$-$L^{32}$-$Q^{31}$; $X^3$ represents an oxygen atom, a sulfur atom, methylene, or imino; $L^{31}$ represents a 5-membered heterocyclic group; $L^{32}$ represents an alkylene or alkenylene group, where one CH$_2$ group or two or more non-adjacent CH$_2$ groups in the alkylene or alkenylene group are each optionally replaced by —O—, —COO—, —OCO—, —OCOO—, —CO—, —S—, —SO$_2$—, —NR$^C$—, —NR$^C$SO$_2$—, or —SO$_2$NR$^C$— (where R$^C$ represents a hydrogen atom or a C1-C4 alkyl group), and where one or two or more hydrogen atoms in these groups are optionally replaced by halogen atoms; and $Q^{31}$s each independently represent a polymerizable group, a hydrogen atom, OH, COOH, or a halogen atom, with at least one $Q^{31}$ being a polymerizable group.

When the polymerizable liquid crystal 30L is uniformly aligned in an inclined manner, the angle θ1 is equal to the angle θ2. When the polymerizable liquid crystal 30L is aligned in a hybrid manner, the angle θ1 is different from the angle θ2. This mode can facilitate adjustment of the average angle θ to an optimum value compared to the case where the angle θ1 is equal to the angle θ2. When the polymerizable liquid crystal 30L is aligned in a hybrid manner, the angle θ1 is preferably greater than the angle θ2.

When the polymerizable liquid crystal 30L is aligned in a hybrid manner, the difference between the angle θ1 and the angle θ2 is preferably not smaller than 0° and not greater than 90°.

Preferably, the azimuth of the optical axis 30XA of the retarder 30 on the surface 30X close to the back surface is parallel to the azimuth of the optical axis 30YA of the retarder 30 on the surface 30Y close to the viewing surface and is perpendicular or parallel to the second transmission axis of the second polarizer 12. This mode can more reduce or prevent a decrease in contrast ratio in the front direction.

Preferably, the azimuth of the optical axis 30XA on the surface 30X of the retarder 30 close to the back surface and the azimuth of the optical axis 30YA of the retarder 30 on the surface 30Y close to the viewing surface are 90°±3°. This mode can reduce or prevent changes in the quantity of light in the upper part (at azimuths of 0° to 180°) while more reducing the quantity of light in the lower part (especially at azimuths of 225° and 315°), finally more reducing or preventing a decrease in contrast ratio in the front direction. The azimuth of the optical axis 30XA and the azimuth of the optical axis 30YA are preferably 90°±1°, more preferably 90°±0.5°.

Preferably, the azimuth of the optical axis 30XA of the retarder 30 on the surface 30X close to the back surface and the azimuth of the optical axis 30YA of the retarder 30 on the surface 30Y close to the viewing surface are 90°±3°, the azimuth of the transmission axis of the second polarizer 12 is 0°±3° (i.e., the azimuth of the absorption axis is 90°±3°), and azimuth of the transmission axis of the third polarizer 13 is 0°±3° (i.e., the azimuth of the reflection axis is 90°±3°). This mode can reduce or prevent changes in the quantity of light in the upper part (at azimuths of 0° to 180°) while still more reducing the quantity of light in the lower part (especially at azimuths of 225° and 315°), finally still more reducing or preventing a decrease in contrast ratio in the front direction. Preferably, the azimuth of the optical axis 30XA and the azimuth of the optical axis 30YA are 90°±1° and the azimuths of the transmission axis of the second polarizer 12 and the transmission axis of the third polarizer 13 are 0°±1°. More preferably, the azimuth of the optical axis 30XA and the azimuth of the optical axis 30YA are 90°±0.5° and the azimuths of the transmission axis of the second polarizer 12 and the transmission axis of the third polarizer 13 are 0°±0.5°.

The alignment state of the polymerizable liquid crystal 30L in the retarder 30 can be controlled by, for example, the surface energy of the surface (e.g., support surface or air surface) in contact with a coating film of the retarder-forming composition, or combination of the types of polymerizable liquid crystal contained in the retarder-forming composition. This enables a change in the degree of inclination of the liquid crystal molecules, such as achievement of hybrid alignment. For example, the inclination angle of the polymerizable liquid crystal 30L on the support surface side of the retarder 30 can be adjusted by selection of material of the polymerizable liquid crystal, material of the alignment film, and a method of rubbing or photo-aligning the alignment film. The inclination angle of liquid crystal molecules on the front surface side (air surface side) of the retarder 30 can be adjusted by selection of, for example, the polymerizable liquid crystal and any other compound (e.g., plasticizer, surfactant, polymerizable monomer, and polymerizable polymer) to be used with the polymerizable liquid crystal. In addition, the degree of change in inclination angle can also be adjusted by the above selection.

Specifically, the inclination angle on the support surface side can be adjusted by optimizing the type and surface energy of the alignment film. The inclination angle on the air surface side can be adjusted by unevenly distributing an air-interface alignment controlling agent, which is to be described later, on the air interface side. Alternatively, the inclination angles can be adjusted by optimizing a variety of parameters in the method of Example 1 disclosed in JP 2013-47758.

In order to achieve a predetermined alignment state of the polymerizable liquid crystal 30L in the retarder 30, the retarder-forming composition may contain one or more additives so as to facilitate application or curing of the retarder-forming composition. In order to align the polymerizable liquid crystal 30L in a hybrid manner, an additive that can control the alignment of the layer on the air interface side (hereinafter, referred to as an "air-interface alignment controlling agent") may be added to the composition. Examples of this additive include a low molecular weight or high molecular weight compound containing a hydrophilic group such as an alkyl fluoride group or a sulfonyl group.

For the retarder 30 containing the polymerizable liquid crystal 30L in a fixed alignment state, the angle θ1 and the angle θ2 are difficult to measure directly and accurately. Thus, in the present description, the angle θ1 and the angle θ2 are calculated by the following method. Although this method still fails to accurately express the actual alignment state, it is useful for expressing the relative relationship of some optical characteristics of the optical element. In order to achieve easy calculation, the following two suppositions are made for this method to be the tilt angles at the two interfaces of the retarder.

1. The retarder is supposed to be a multilayer of layers containing liquid crystal molecules such as polymerizable liquid crystal. In addition, the minimum unit layer defining the retarder (the tilt angle of the liquid crystal molecules is supposed to be uniform within the layer) is supposed to be optically uniaxial.
2. The tilt angles of the layers are supposed to vary monotonically in a linear function along the thickness direction of the retarder. The specific calculation method is as follows.

(1) In a plane where the tilt angles of the layers vary monotonically in a linear function along the thickness direction of the retarder, the angle of incidence of measurement light on the retarder is changed and the retardation value is measured at three or more measurement angles. To simplify the measurement and calculation, preferably, the direction normal to the retarder is set to 90° and the retardation value is measured at three measurement angles 50°, 90°, and 130°. The measurement may be performed using, for example, KOBRA-21 ADH or KOBRA-WR (each available from Oji Scientific Instruments Co., Ltd.), or AxoScan (available from Axometrics, Inc.).

(2) In each layer, the refractive index of ordinary light is expressed by "no", the refractive index of extraordinary light is expressed by "ne" (all layers have the same no value and the same ne value), and the thickness of the entire multilayer is expressed by "d". On the supposition that the tilt direction in a layer corresponds to the optical axis direction of the single axis of the same layer, fitting is performed using as variables the angle θ1 on one surface of the retarder, the angle θ2 on the other surface, and the thickness d such that the calculation of the polar angle dependence of the retardation value of the retarder corresponds to the measured value. Thereby, the angle θ1, the angle θ2, and the thickness d are calculated.

The retarder 30 is a monolayer (specifically, a monolayer in the form of film). Still, as described above, on the supposition that the retarder 30 is hypothetically a stack of a plurality of thin layers and each thin layer has an optical axis, the optical axis on the surface close to the back surface and the optical axis on the surface close to the viewing surface can be defined for the retarder 30.

The backlight 40 includes a reflective sheet, a diffusion sheet, and a light source unit including a light guiding panel and a light source.

In addition to the above components, the liquid crystal display device 1 of the present embodiment includes a plurality of components such as external circuits, e.g., a tape carrier package (TCP) and a printed circuit board (PCB); optical films, e.g., a viewing angle increasing film and a luminance improving film; and a bezel (frame). A component may be incorporated in another component. Description for the components other than the described components is omitted because they are not limited and may be those typically used in the field of liquid crystal display devices.

EXAMPLES

Hereinafter, the present invention is described based on examples and comparative examples. The examples, however, are not intended to limit the present invention.

Example 1, Comparative Example 1, and Reference Example 1

Figure 6A:
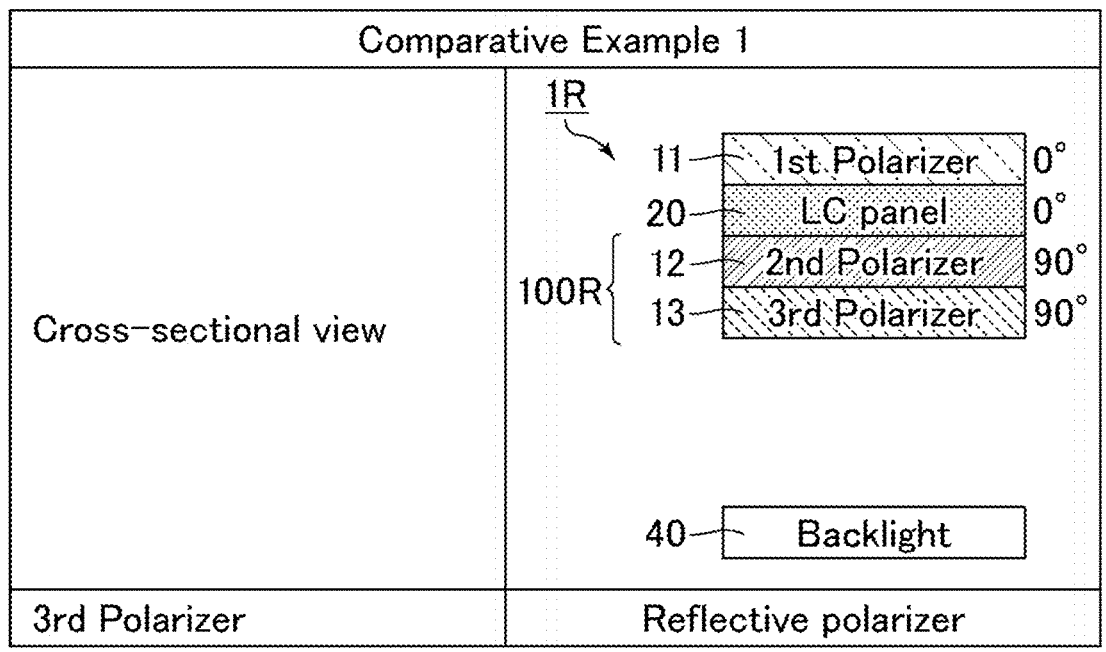
FIG. 6A is a diagram for illustrating the structure of a liquid crystal display device of Comparative Example 1.
Figure 7B:
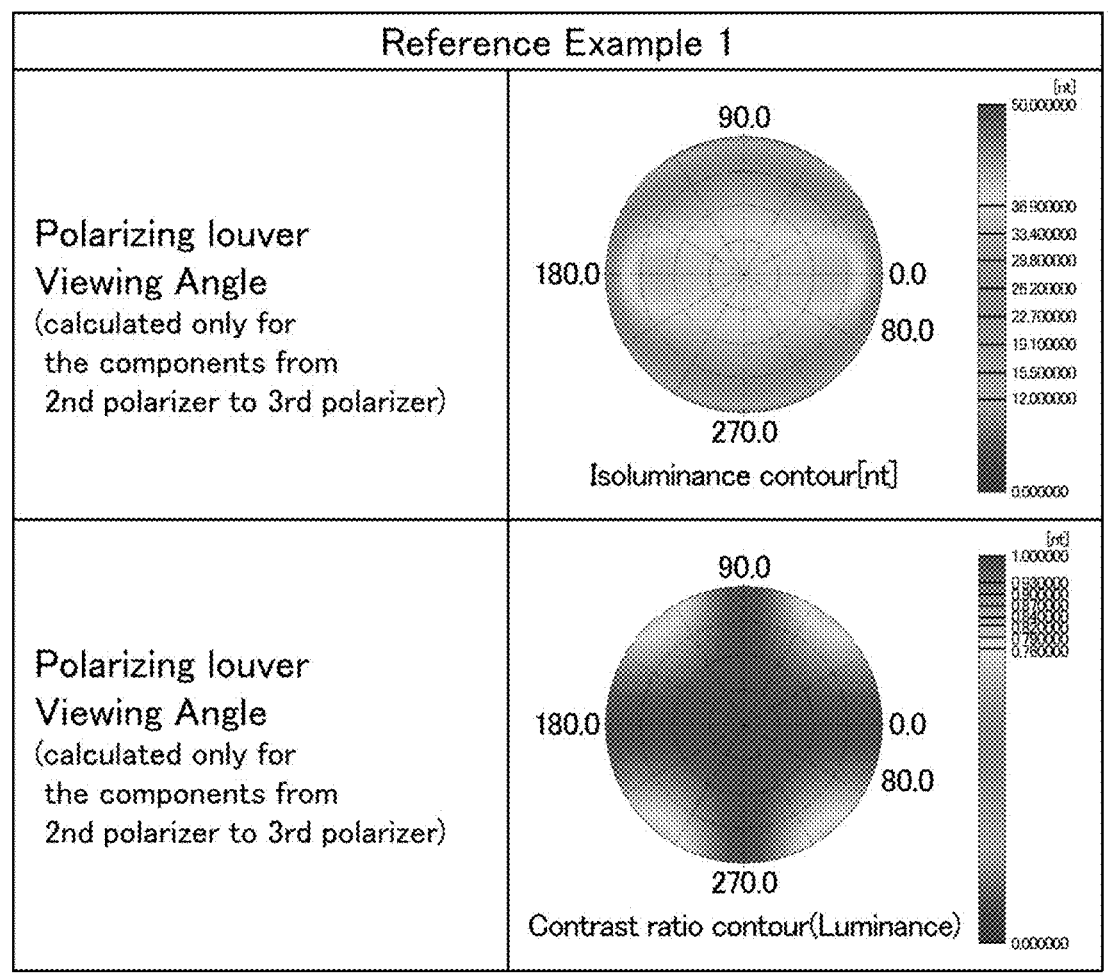
FIG. 7B is a diagram including the results of calculating the transmittance viewing angles of a polarizing louver in Reference Example 1 and results of calculating the transmittance viewing angles of the polarizing louver in Reference Example 1 normalized with the optical element in Comparative Example 1.
Figure 8A:
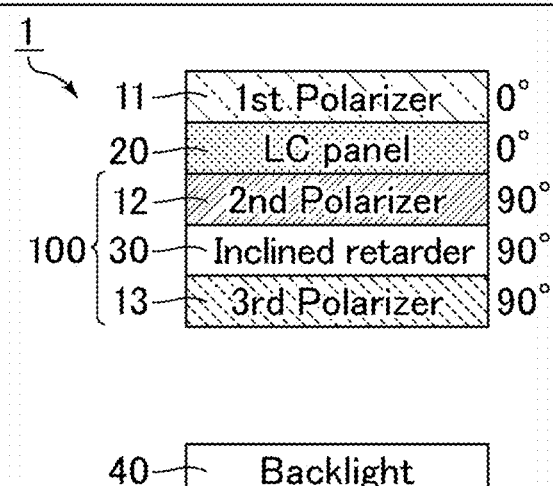
FIG. 8A is a diagram for illustrating the structure of a liquid crystal display device of Example 1.

Liquid crystal display devices of Comparative Example 1, Reference Example 1, and Example 1 respectively have the structures shown in FIG. 6A, FIG. 7A, and FIG. 8A. FIG. 6A is a diagram for illustrating the structure of the liquid crystal display device of Comparative Example 1. FIG. 7A is a diagram for illustrating the structure of the liquid crystal display device of Reference Example 1. FIG. 8A is a diagram for illustrating the structure of the liquid crystal display device of Example 1. The axis azimuths of the respective components are shown in the schematic cross-sectional view. The axis azimuth of the absorptive polarizer indicates the azimuth of the absorption axis, the axis azimuth of the retarder indicates the azimuth of the optical axis (azimuth of the in-plane slow axis), the axis azimuth of the reflective polarizer indicates the azimuth of the reflective axis, and the axis azimuth of the liquid crystal panel indicates the azimuth of the slow axis. In the figures, d represents the thickness of the retarder and R represents the retardation.

In the case of a retarder having an average angle θ=90°, i.e., a C plate in which the optical axes correspond to the normal direction, the in-plane slow axis is not defined and the axis azimuth of the retarder is not defined. In contrast, in the case of a retarder in which the optical axes are uniformly inclined toward a specific azimuth or in the case of a retarder in which the optical axes have different inclination angles but are uniformly inclined in the same inclination azimuth, as in the case of the retarders 30 in Example 1 and Examples 2 to 8 to be described later, this inclination azimuth corresponds to the in-plane slow axis and the axis azimuth of the retarder can be defined.

In the figures, the retardation R of the retarder other than the C plate indicates the in-plane retardation Rp. In contrast, the retardation R of the C plate indicates the thickness retardation Rth because the in-plane retardation thereof is 0.

The retardation R was determined using a dual retarder rotating polarimeter (trade name: Axo-scan available from Axometrics, Inc.). The in-plane retardation Rp was determined in the normal direction of the birefringent layer. The thickness retardation Rth was calculated by determining the retardations in the normal direction of the birefringent layer and in oblique directions inclined by −50° to 50° from the normal direction and performing a known refractive index ellipsoidal curve fitting. The inclination azimuth was set to the azimuth perpendicular to the in-plane slow axis.

The thickness retardation Rth depends on the average refractive index=(nx+ny+nz)/3 given as a calculating condition for the curve fitting, where the average refractive index of each birefringent layer was unified to 1.5 for the calculation. For a birefringent layer having an actual average refractive index of not 1.5, the average refractive index was supposed to be and converted to 1.5.

In some manufacturing methods, the inclination angles of the optical axes of the retarder 30 are not always uniform relative to the thickness direction of the retarder. Thus, in the figures, the inclination angle of the optical axis of the retarder 30 on the surface close to the backlight 40 (the surface close to the back surface), i.e., the angle formed by the optical axis of the retarder 30 on the surface close to the back surface and the surface close to the back surface, is defined as the angle θ1; the inclination angle of the optical axis on the surface close to a viewer, i.e., the angle formed by the optical axis of the retarder 30 on the surface close to the viewing surface and the surface close to the viewing surface, is defined as the angle θ2; and the average of these angles is defined as the average angle θ.

The retarder 30S of Reference Example 1 was produced in the same manner as for a positive C plate described in [0082] to [0089] of WO 2016/158300. Specifically, first, a coating liquid (B) for forming an alignment film having the following composition was continuously applied using a #14 wire bar to a cellulose acylate film without alkali saponification. The cellulose acylate film with the coating liquid (B) for an alignment film was dried with warm air at 60° C. for 60 seconds, then with warm air at 100° C. for 120 seconds, whereby an alignment film was formed.

(Composition of coating liquid (B) for alignment film)
Modified polyvinyl alcohol represented by the following formula (PVA-1): 10 parts by mass
Water: 371 parts by mass
Methanol: 119 parts by mass
Glutaraldehyde (crosslinking agent): 0.5 parts by mass
Citric acid ester (AS3 available from Sankyo Chemical Co., Ltd.): 0.175 parts by mass
Photo-polymerization initiator (Irgacure 2959 available from Ciba Japan): 2.0 parts by mass

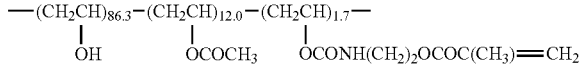

$$-(CH_2CH)_{86.3}-(CH_2CH)_{12.0}-(CH_2CH)_{1.7}-$$
$$\quad\quad | \quad\quad\quad\quad | \quad\quad\quad\quad |$$
$$\quad OH \quad\quad OCOCH_3 \quad OCONH(CH_2)_2OCOC(CH_3)=CH_2$$

(PVA-1)

A coating liquid (C) for an optically anisotropic layer containing a rod-shaped liquid crystal compound having the following composition was continuously applied using a #5.0 wire bar to the alignment film formed above. The film was transported at a speed (V) of 26 m/min. The film with the coating liquid (C) for an optically anisotropic layer was heated with warm air at 60° C. for 60 seconds to evaporate the solvent of the coating liquid and to age the alignment of the rod-shaped liquid crystal compound. The resulting film was then irradiated with UV at 60° C. so that the alignment of the rod-shaped liquid crystal compound was fixed, whereby the retarder 30S of Reference Example 1 was produced.

(Composition of coating liquid (C) for optically anisotropic layer)

Rod-shaped liquid crystal compound represented by the following formula (LCL-1): 80 parts by mass
Rod-shaped liquid crystal compound represented by the following formula (LCL-2): 20 parts by mass
Photo-polymerization initiator (Irgacure 907 available from Ciba Japan): 3 parts by mass
Sensitizer (KAYACURE DETX available from Nippon Kayaku Co., Ltd.): 1 part by mass
Fluorine-containing compound represented by the following formula (F-1): 0.3 parts by mass
Alignment-film-interface aligning agent 1: 0.55 parts by mass
Methyl ethyl ketone: 193 parts by mass 1S of Reference Example 1) were produced and the contrast ratios (CRs) in the front direction of the liquid crystal display devices of Comparative Example 1 and Reference Example 1 were determined. Specifically, a viewing angle measurement device (trade name: EZContrast 160 available from Eldim) was used to measure the luminance in the white display and the luminance in the black display. The ratio thereof was defined as the contrast ratio (CR) in the front direction. Also, the contrast ratio in the front direction of the liquid crystal display device of Example 1 was calculated by simulation. The contrast ratio in the front direction was calculated using a liquid crystal optical simulator (LCD Master, available from Shintech Co., Ltd.). The contrast ratio in the front direction was 1520 in Comparative Example 1, 1657 in Reference Example 1, and 1626 in Example 1.

Figure 6B:
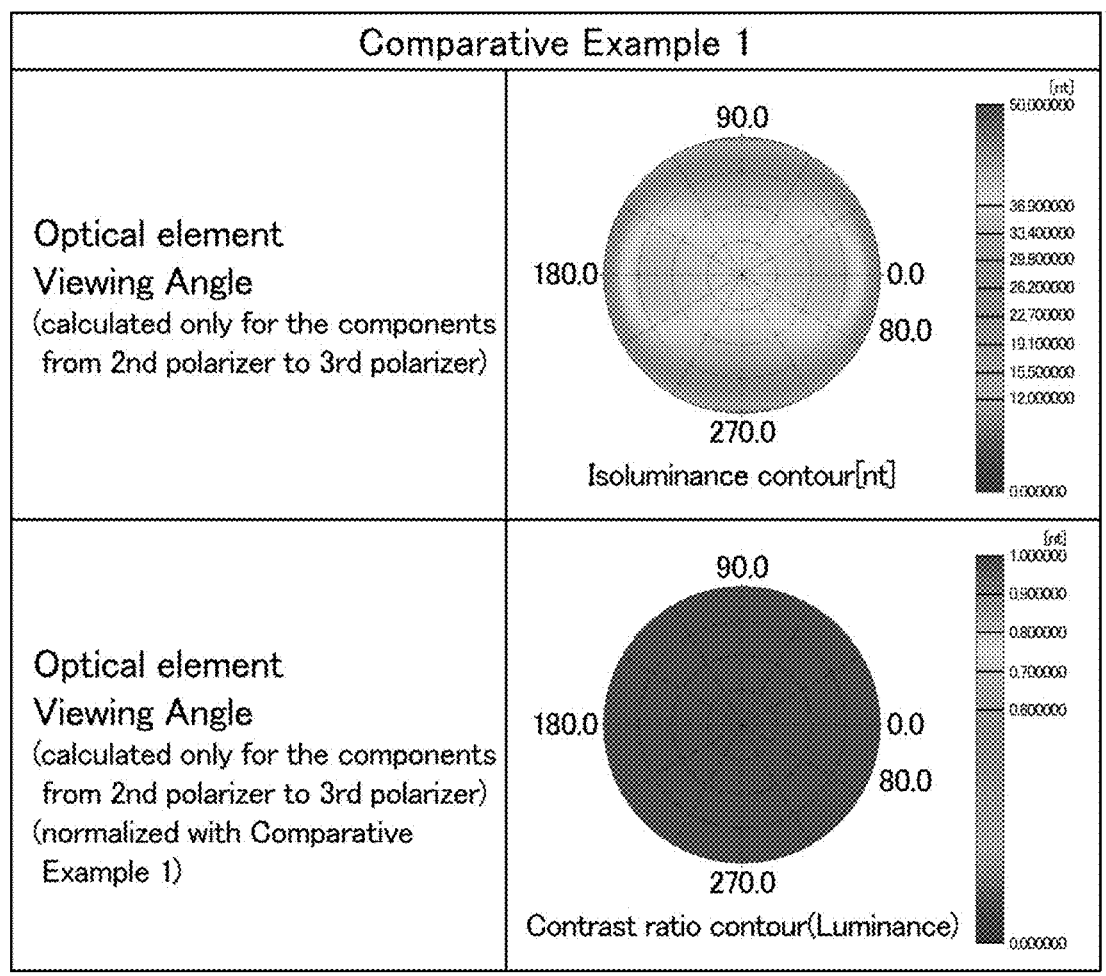
FIG. 6B is a diagram including the results of calculating the transmittance viewing angles of an optical element in Comparative Example 1 and results of calculating the transmittance viewing angles of the optical element in Comparative Example 1 normalized with the optical element in Comparative Example 1.
Figure 8B:
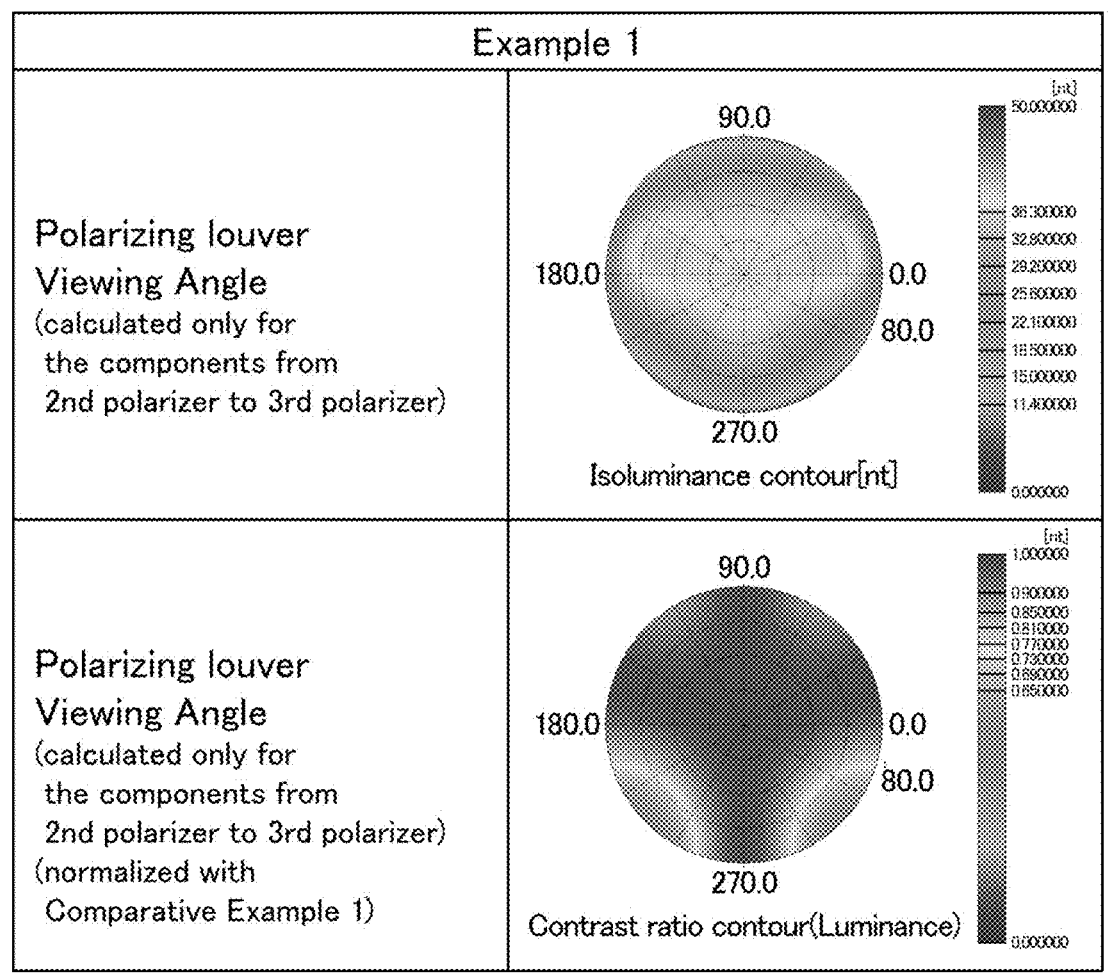
FIG. 8B is a diagram including the results of calculating the transmittance viewing angles of a polarizing louver in Example 1 and results of calculating the transmittance viewing angles of the polarizing louver in Example 1 normalized with the optical element in Comparative Example 1.

In order to comprehend the light distribution of backlight illumination incident on the liquid crystal panels of Comparative Example 1, Reference Example 1, and Example 1, the transmittance viewing angle characteristics of a set of the parts below the liquid crystal panel, i.e., the optical element including the components from the second polarizer 12 to the third polarizer 13 (in particular, the optical element including a retarder between the second polarizer 12 and the third polarizer 13 is also referred to as a polarizing louver) were calculated. The results are shown in FIG. 6B, FIG. 7B, and FIG. 8B. FIG. 6B is a diagram including the results of calculating the transmittance viewing angles of the optical

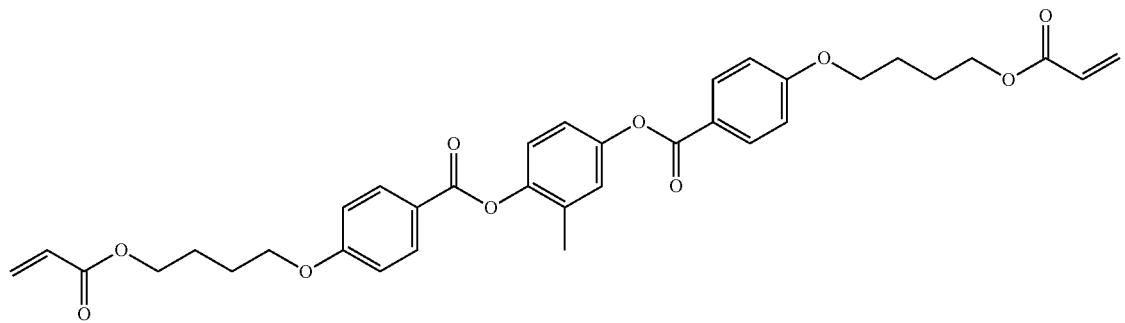

(LCL-1)

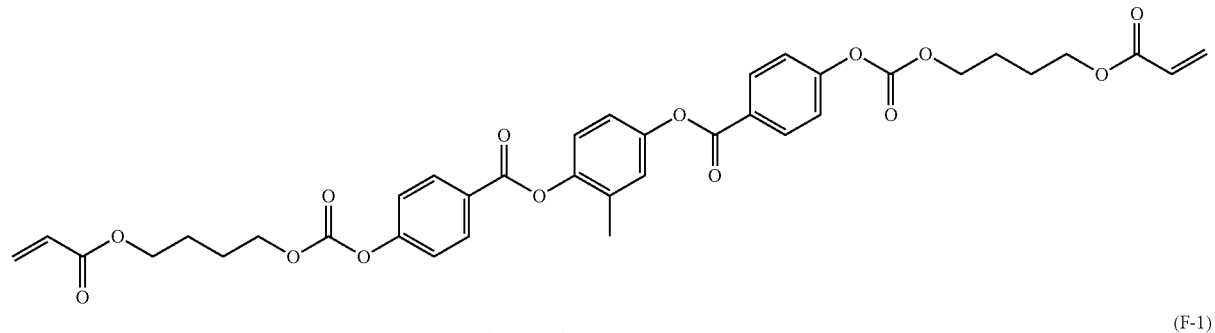

(LCL-2)

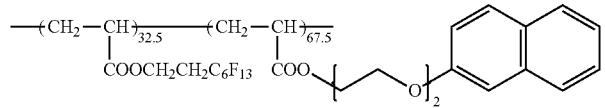

(F-1)

Liquid crystal display devices of Comparative Example 1 and Reference Example 1 (liquid crystal display device 1R of Comparative Example 1 and liquid crystal display device element in Comparative Example 1 and the results of calculating the transmittance viewing angles of the optical element in Comparative Example 1 normalized with the optical element in Comparative Example 1. FIG. 7B is a diagram including the results of calculating the transmittance viewing angles of the polarizing louver in Reference Example 1 and the results of calculating the transmittance viewing angles of the polarizing louver in Reference Example 1 normalized with the optical element in Comparative Example 1. FIG. 8B is a diagram including the results of calculating the transmittance viewing angles of the polarizing louver in Example 1 and the results of calculating the transmittance viewing angles of the polarizing louver in Example 1 normalized with the optical element in Comparative Example 1. The transmittance viewing angle characteristics were calculated using a liquid crystal optical simulator (LCD Master, available from Shintech Co., Ltd.). On the supposition that the retarder 30 of Example 1 was composed of a rod-shaped liquid crystal compound, the refractive indices and the thickness were set to the following fixed values: ne=1.6, no=1.5, Δn=0.1, and d=2 μm.

The viewing angle characteristics at the bottom of the figure are those normalized with the viewing angle characteristics in Comparison Example 1 and correspond to the transmittance viewing angle characteristics relative to those of Comparison Example 1. Unless otherwise noted, the following description refers to the normalized viewing angle characteristics.

In Comparative Example 1 where an optical element 100R including the second polarizer 12 and the third polarizer 13 was used, the contrast ratio in the front direction obtained was insufficient. In Reference Example 1 where a polarizing louver 100S including the second polarizer 12, the retarder 30S, and the third polarizer 13 was used, the contrast ratio in the front direction obtained was sufficient. Still, as shown in FIG. 7B, the light distribution of the polarizing louver 100S of Reference Example 1 was substantially cross-shaped, and the light incident on the liquid crystal panel was restricted at azimuths of 45°, 135°, 225° and 315°. In other words, this reference example failed to reduce or prevent a decrease in transmittance in the white display at azimuths of 0° to 180°.

In contrast, the results demonstrate that the liquid crystal display device 1 of Example 1 including the retarder 30 having an optical axis inclined from the normal direction achieved a sufficient contrast ratio in the front direction and that the polarizing louver 100 of Example 1 selectively reduced the quantity of light at azimuths of 225° and 315° while caused no reduction in transmittance (luminance) in the white display at azimuths of 45° and 135°, which is important for automotive display devices. As described, Example 1 showed no change in quantity of light in the upper part (at azimuths of 0° to 180°), while reducing the quantity of light in the lower part (particularly, at azimuths of 225° and 315°). Accordingly, the present example was able to satisfy the white luminance in the upper part while reducing light leakage in the black display, increasing the contrast ratio in the front direction.

Examples 2 to 8

Figure 9A:
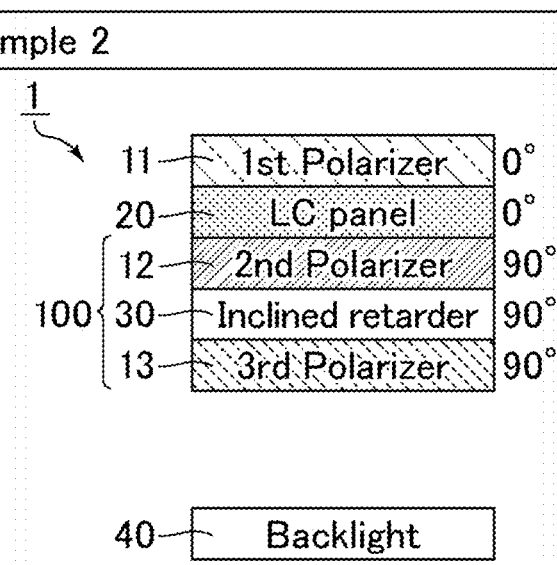
FIG. 9A is a diagram for illustrating the structure of a liquid crystal display device of Example 2.
Figure 10A:
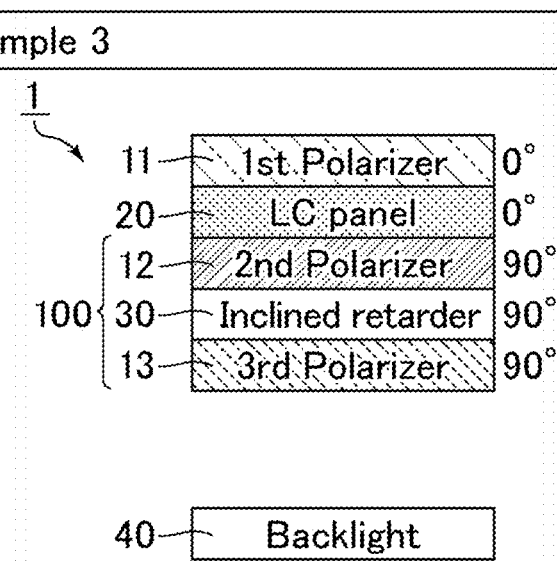
FIG. 10A is a diagram for illustrating the structure of a liquid crystal display device of Example 3.
Figure 11A:
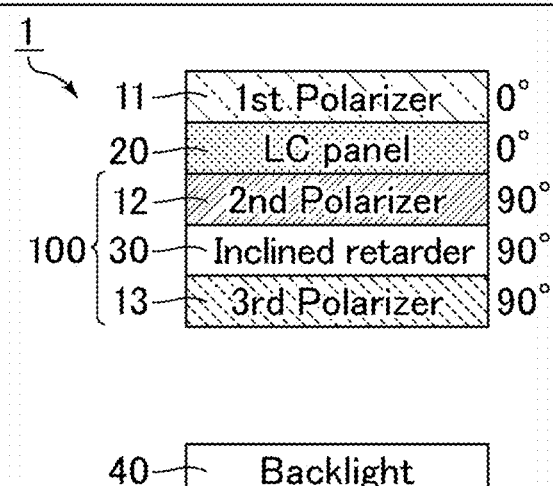
FIG. 11A is a diagram for illustrating the structure of a liquid crystal display device of Example 4.
Figure 12A:
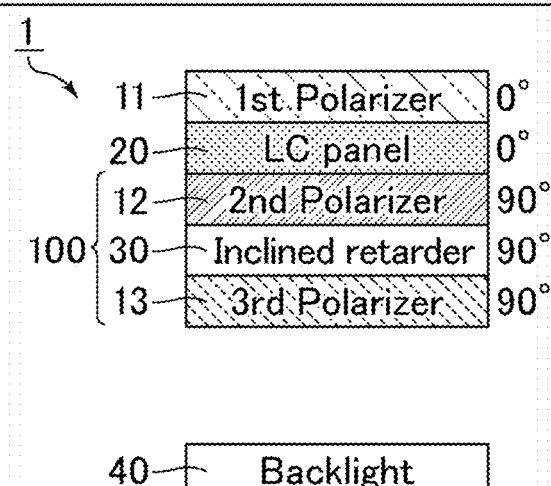
FIG. 12A is a diagram for illustrating the structure of a liquid crystal display device of Example 5.
Figure 13B:
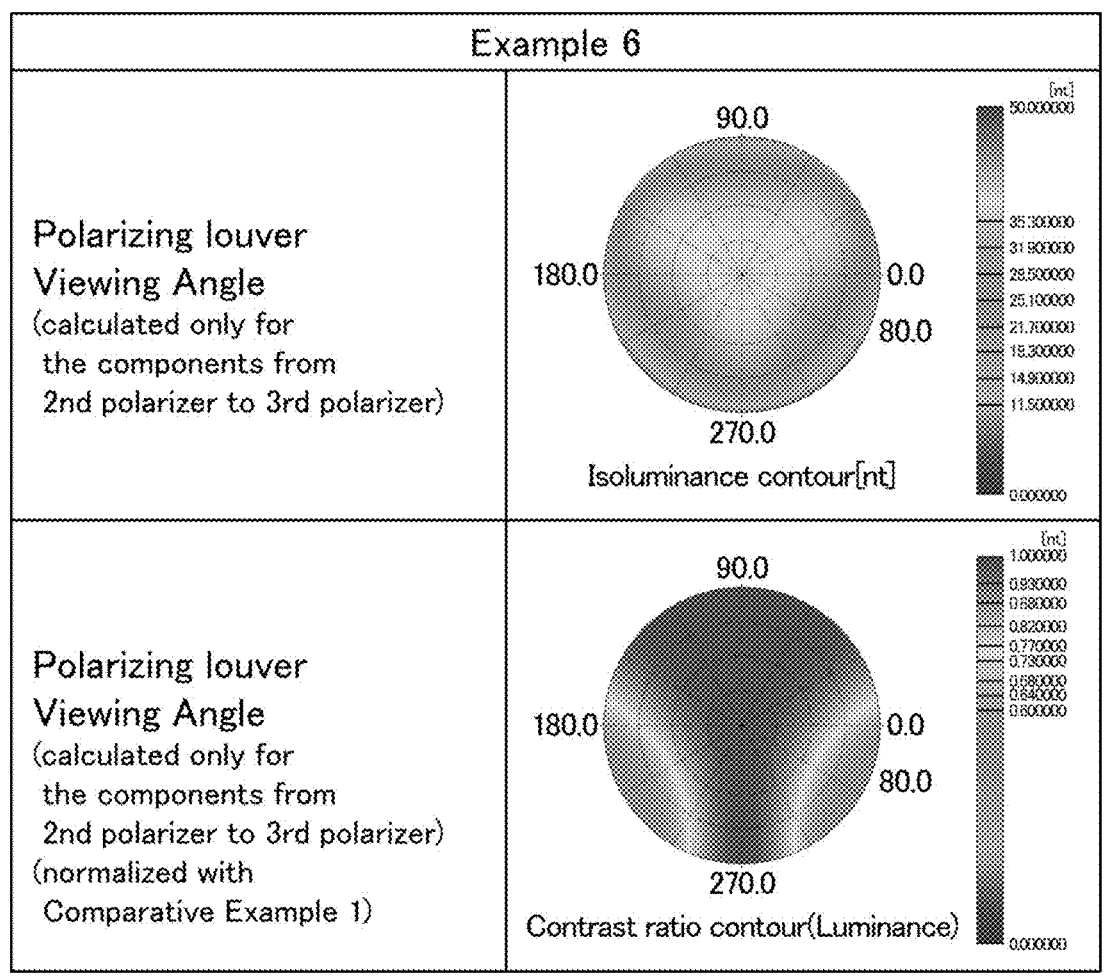
FIG. 13B is a diagram including the results of calculating the transmittance viewing angles of a polarizing louver in Example 6 and results of calculating the transmittance viewing angles of the polarizing louver in Example 6 normalized with the optical element in Comparative Example 1.
Figure 14A:
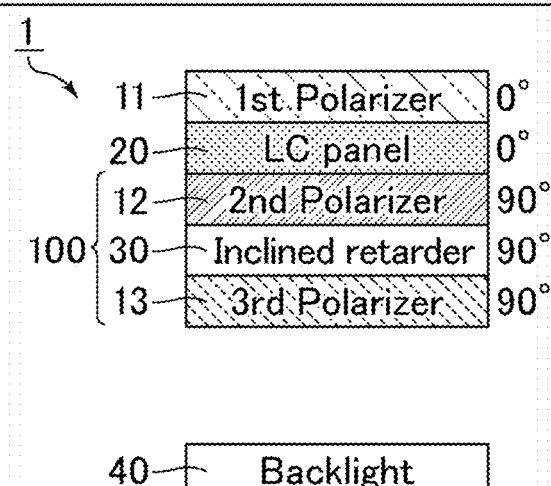
FIG. 14A is a diagram for illustrating the structure of a liquid crystal display device of Example 7.

Liquid crystal display devices of Examples 2 to 8 respectively have the structures shown in FIG. 9A, FIG. 10A, FIG. 11A, FIG. 12A, FIG. 13A, FIG. 14A, and FIG. 15A. The liquid crystal display devices of Examples 2 to 8 have the same structure as in Example 1 except that the angle θ1, the angle θ2, and the average angle θ are different from those in Example 1 and the retarder 30 (inclined retarder) had an average angle θ of greater than 0° and smaller than 90°. FIG. 9A is a diagram for illustrating the structure of the liquid crystal display device of Example 2. FIG. 10A is a diagram for illustrating the structure of the liquid crystal display device of Example 3. FIG. 11A is a diagram for illustrating the structure of the liquid crystal display device of Example 4. FIG. 12A is a diagram for illustrating the structure of the liquid crystal display device of Example 5. FIG. 13A is a diagram for illustrating the structure of the liquid crystal display device of Example 6. FIG. 14A is a diagram for illustrating the structure of the liquid crystal display device of Example 7. FIG. 15A is a diagram for illustrating the structure of the liquid crystal display device of Example 8.

The retarder 30 of Example 4 was produced as follows. First, an alignment agent for a photoalignment film (trade name: "ROF103" available from Rolic Technologies Ltd.) was applied to a surface of a substrate (polymer film containing triacetyl cellulose as a main component (available from Fujifilm Corp.)) having a thickness of 80 μm using a spin coater (conditions: 3000 rpm for 1 minute) and dried in an air-circulating constant-temperature oven at 100° C. for 10 minutes. Thereby, a photoalignment film having a thickness of 70 nm was formed. This photoalignment film was subjected to tilted alignment treatment, i.e., irradiated with polarized ultraviolet light (dose: 100 mJ/cm2) in an oblique direction of 140° relative to the substrate planes.

Next, a coating liquid (concentration: 20% by weight) was prepared that contained cyclopentanone and a liquid crystal composition containing a rod-shaped liquid crystal compound having two crosslinkable functional groups in the molecular structure and a polymerization initiator (trade name: "ROP5101" available from Rolic Co., Ltd., liquid crystal temperature range: 30° C. to 57° C.). The coating liquid was then applied to a surface of the photoalignment film and the interface of the coating liquid opposite to the substrate was brought into contact with the air. In this state, the workpiece was heated to 50° C. and maintained at this temperature for two minutes. Thereby, a solidified layer of the rod-shaped liquid crystal compound aligned in a hybrid arrangement was formed. This solidified layer was irradiated with ultraviolet light (dose: 500 mJ/cm$^2$ at 365 nm) in a nitrogen atmosphere, whereby a retarder 30 having a thickness of 1.1 μm was formed on the substrate (the polymer film containing triacetyl cellulose as a main component). In Example 4, the retarder 30 was transferred to the second polarizer 12 via an adhesive while being removed from the substrate.

For the liquid crystal display device of Example 4, the front contrast ratio was measured as in Comparative Example 1. For the liquid crystal display devices of Examples 2 and 3 and 5 to 8, the contrast ratio in the front direction was calculated as in Example 1. The liquid crystal display devices of Examples 2 to 8 each had a contrast ratio in the front direction similar to that of Example 1 and thus had a sufficient contrast ratio in the front direction.

Figure 9B:
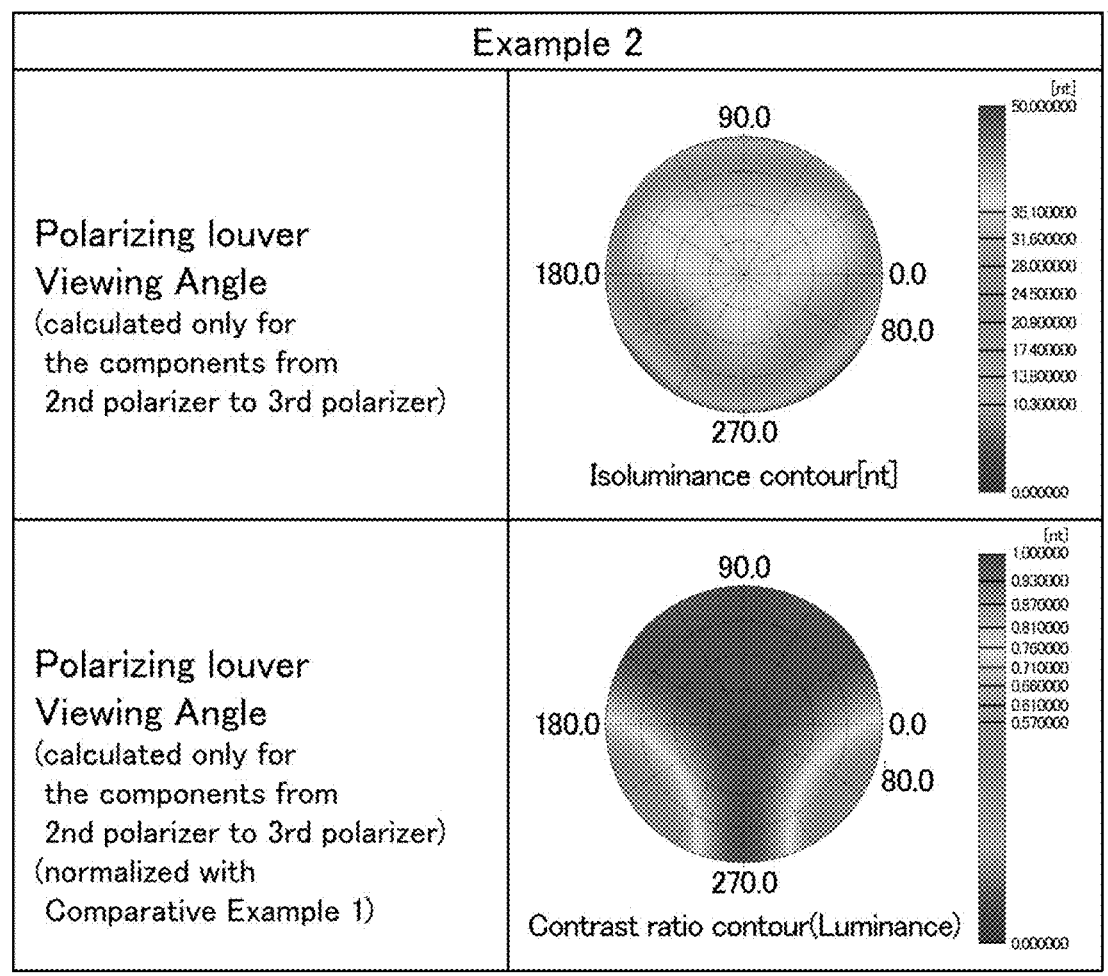
FIG. 9B is a diagram including the results of calculating the transmittance viewing angles of a polarizing louver in Example 2 and results of calculating the transmittance viewing angles of the polarizing louver in Example 2 normalized with the optical element in Comparative Example 1.
Figure 10B:
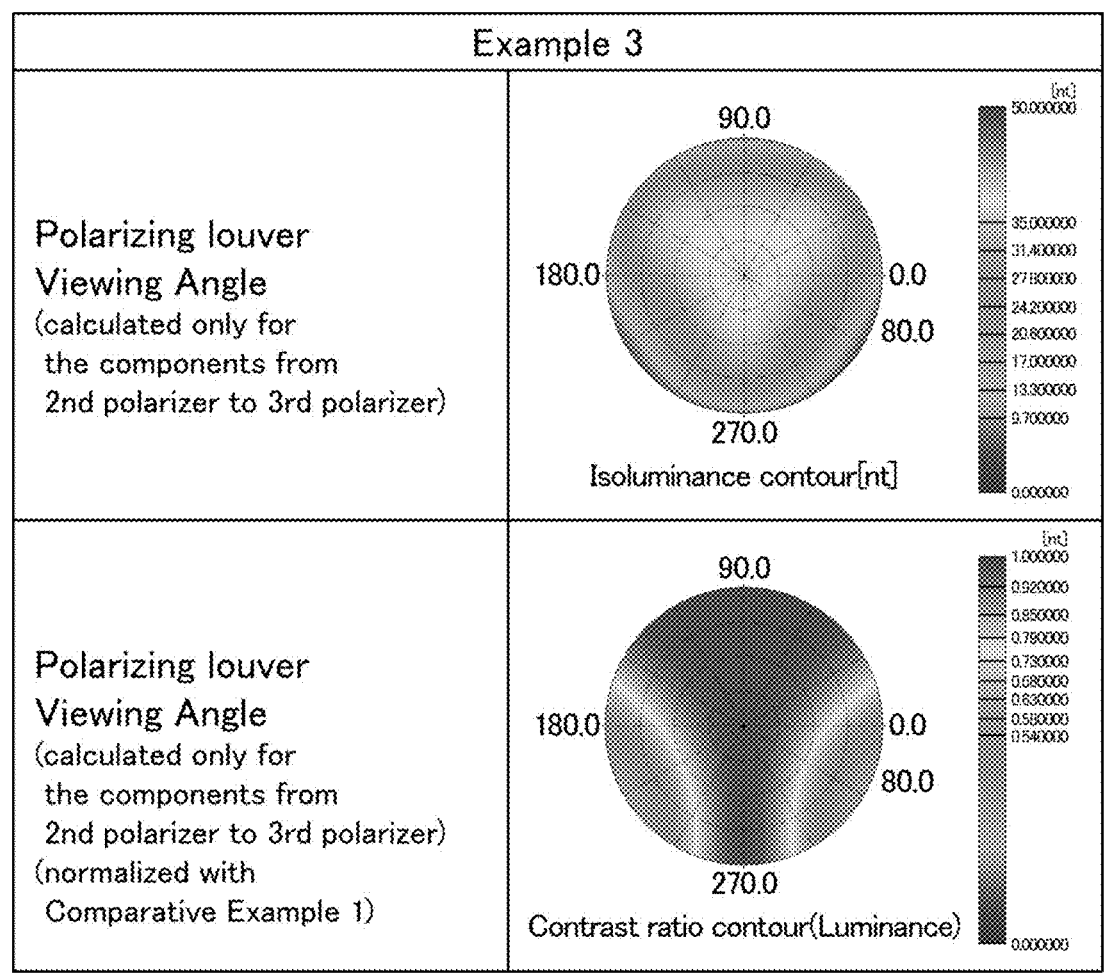
FIG. 10B is a diagram including the results of calculating the transmittance viewing angles of a polarizing louver in Example 3 and results of calculating the transmittance viewing angles of the polarizing louver in Example 3 normalized with the optical element in Comparative Example 1.
Figure 11B:
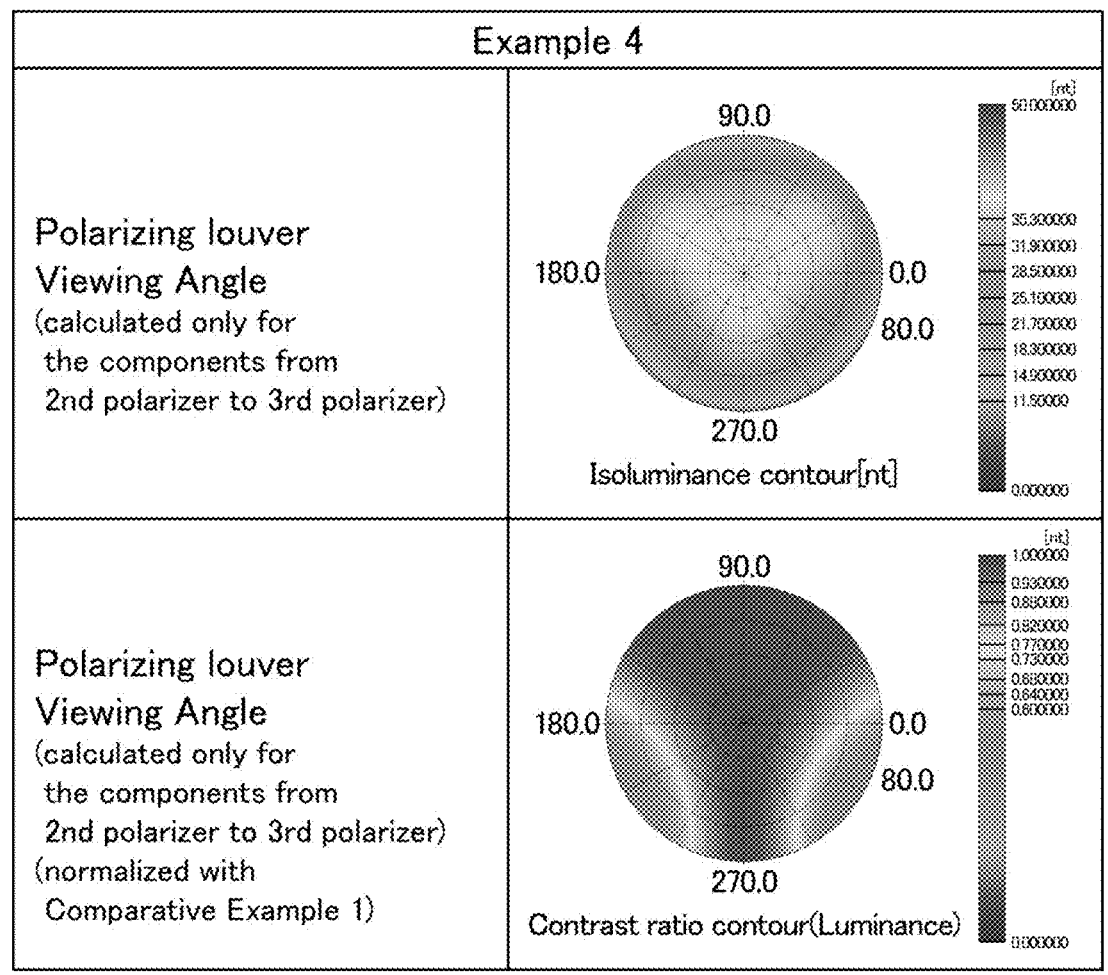
FIG. 11B is a diagram including the results of calculating the transmittance viewing angles of a polarizing louver in Example 4 and results of calculating the transmittance viewing angles of the polarizing louver in Example 4 normalized with the optical element in Comparative Example 1.
Figure 12B:
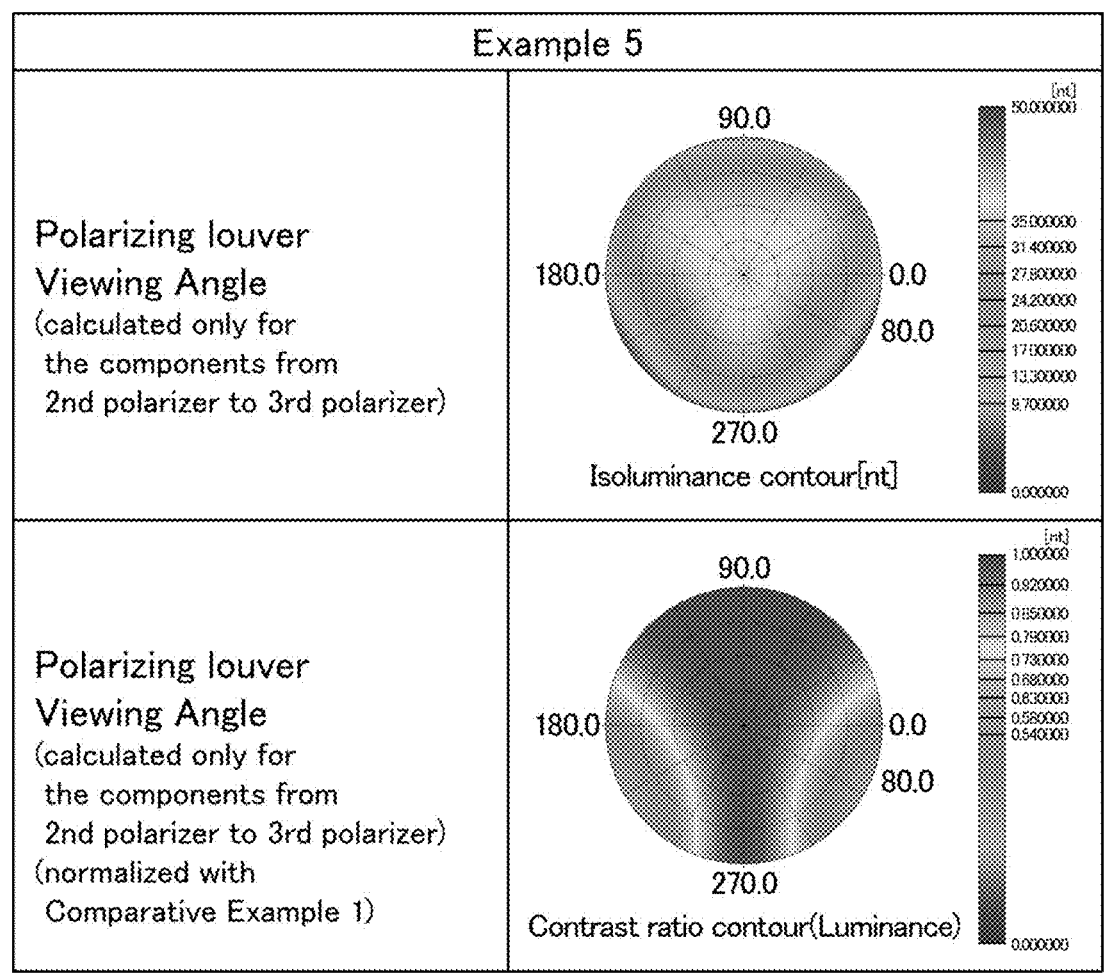
FIG. 12B is a diagram including the results of calculating the transmittance viewing angles of a polarizing louver in Example 5 and results of calculating the transmittance viewing angles of the polarizing louver in Example 5 normalized with the optical element in Comparative Example 1.
Figure 14B:
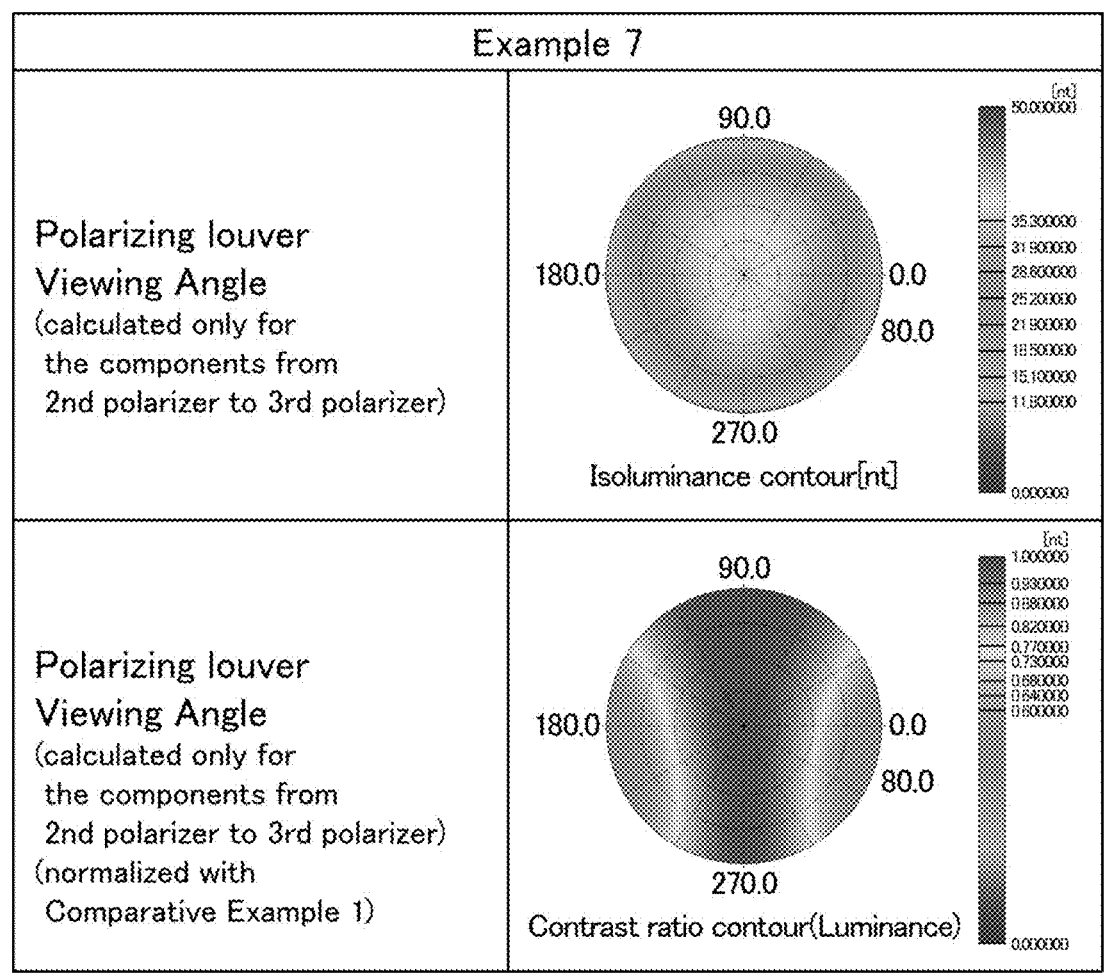
FIG. 14B is a diagram including the results of calculating the transmittance viewing angles of a polarizing louver in Example 7 and results of calculating the transmittance viewing angles of the polarizing louver in Example 7 normalized with the optical element in Comparative Example 1.
Figure 15B:
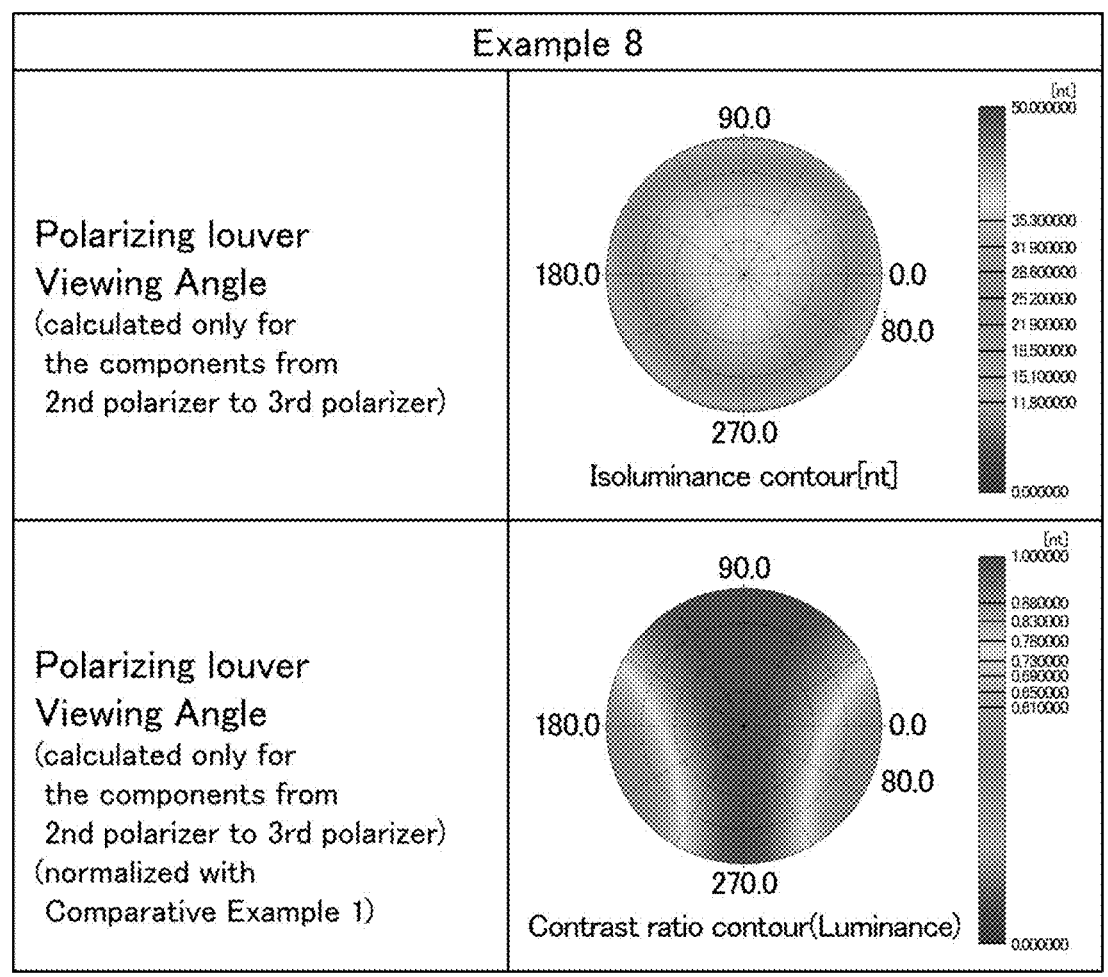
FIG. 15B is a diagram including the results of calculating the transmittance viewing angles of a polarizing louver in Example 8 and results of calculating the transmittance viewing angles of the polarizing louver in Example 8 normalized with the optical element in Comparative Example 1.

For Examples 2 to 8, the transmittance viewing angle characteristics of the polarizing louvers were calculated as in Example 1. The results are shown in FIG. 9B, FIG. 10B, FIG. 11B, FIG. 12B, FIG. 13B, FIG. 14B, and FIG. 15B. FIG. 9B is a diagram including the results of calculating the transmittance viewing angles of the polarizing louver in Example 2 and the results of calculating the transmittance viewing angles of the polarizing louver in Example 2 normalized with the optical element in Comparative Example 1. FIG. 10B is a diagram including the results of calculating the transmittance viewing angles of the polarizing louver in Example 3 and the results of calculating the transmittance viewing angles of the polarizing louver in Example 3 normalized with the optical element in Comparative Example 1. FIG. 11B is a diagram including the results of calculating the transmittance viewing angles of the polarizing louver in Example 4 and the results of calculating the transmittance viewing angles of the polarizing louver in Example 4 normalized with the optical element in Comparative Example 1. FIG. 12B is a diagram including the results of calculating the transmittance viewing angles of the polarizing louver in Example 5 and the results of calculating the transmittance viewing angles of the polarizing louver in Example 5 normalized with the optical element in Comparative Example 1. FIG. 13B is a diagram including the results of calculating the transmittance viewing angles of the polarizing louver in Example 6 and the results of calculating the transmittance viewing angles of the polarizing louver in Example 6 normalized with the optical element in Comparative Example 1. FIG. 14B is a diagram including the results of calculating the transmittance viewing angles of the polarizing louver in Example 7 and the results of calculating the transmittance viewing angles of the polarizing louver in Example 7 normalized with the optical element in Comparative Example 1. FIG. 15B is a diagram including the results of calculating the transmittance viewing angles of the polarizing louver in Example 8 and the results of calculating the transmittance viewing angles of the polarizing louver in Example 8 normalized with the optical element in Comparative Example 1. In the calculation of the transmittance viewing angle characteristics in Examples 2 to 8, as in Example 1, the retarder 30 was supposed to be composed of a rod-shaped liquid crystal compound, the refractive indices and the thickness were set to the following fixed values: $ne=1.6$, $no=1.5$, $\Delta n=0.1$, and $d=2$ μm. Only the angle $\theta 1$, the angle $\theta 2$, and the average angle $\theta$ were changed.

As in Example 1, the polarizing louvers 100 of Example 2 to 8 also showed no change in quantity of light in the upper part (at azimuths of 0° to 180°), while reducing the quantity of light in the lower part (particularly, at azimuths of 225° and 315°). Accordingly, these examples were able to satisfy the white luminance in the upper part while reducing light leakage in the black display, increasing the contrast ratio in the front direction.

The results also demonstrated that the larger the average angle $\theta$ was, the wider the range of angle providing a low transmittance in the lower part was and the higher the effect was. In particular, the liquid crystal display device 1 of Example 4 was found to have a higher contrast ratio in the front direction than that of Comparative Example 1 and a wider white luminance viewing angle than that of Reference Example 1, having a wider viewing angle in the upper part. Evaluation of the actually produced liquid crystal display devices of Comparative Example 1, Reference Example 1, and Example 4 demonstrated that the liquid crystal display device of Example 4 had a higher contrast ratio in the front direction than that of Comparative Example 1 and a wider white luminance viewing angle than that of Reference Example 1. In particular, the evaluation demonstrated that the liquid crystal display device of Example 4 had a wide viewing angle in the upper part.

REFERENCE SIGNS LIST

1, 1R, 1S: liquid crystal display device
11: first polarizer
11A, 12A, 13A: axis azimuth
12: second polarizer
13: third polarizer
20: liquid crystal panel
30: retarder (inclined retarder)
30L: polymerizable liquid crystal
30S: retarder
30SA, 30XA, 30YA: optical axis (slow axis)
30X, 30Y: surface
40: backlight
100, 100S: polarizing louver
100R: optical element
$\theta$: average angle
$\theta 1, \theta 2$: angle

What is claimed is:
1. A liquid crystal display device, comprising:
   a polarizing louver that functions as an optical louver including, sequentially from a viewing surface side toward a back surface side:
      a viewing-surface-side polarizer;
      a retarder; and
      a back-surface-side polarizer;
   a liquid crystal panel directly on a viewing surface side of the viewing-surface-side polarizer of the polarizing louver; and
   a polarizer directly on a viewing surface side of the liquid crystal panel; wherein
   the back-surface-side polarizer is a reflective polarizer,
   a transmission axis of the viewing-surface-side polarizer and a transmission axis of the back-surface-side polarizer are parallel to each other,
   the polarizing louver has an average angle $\theta$ between an angle $\theta 1$ and an angle $\theta 2$ of not smaller than 50° and not greater than 80°,
   the angle $\theta 1$ is equal to the angle $\theta 2$,
   the angle $\theta 1$ represents an angle formed by an optical axis of the retarder on a first surface adjacent to the back surface with the first surface adjacent to the back surface; and the angle $\theta 2$ represents an angle formed by an optical axis of the retarder on a second surface adjacent to the viewing surface with the second surface adjacent to the viewing surface,
   the optical axis of the retarder on the first surface adjacent to the back surface and the optical axis of the retarder on the second surface adjacent to the viewing surface each have an azimuth of 90°±3°, provided that an azimuth of 0° is set to the horizontally right direction on a screen of the liquid crystal panel and that the azimuths measure positive in a counterclockwise direction and measure negative in a clockwise direction,
   each of the optical axes of the retarder on the first surface and on the second surface is inclined from normal directions of the first surface and the second surface, and
   each of the azimuths of the optical axes is defined as an azimuth of a direction from a side closer to the first surface to a side closer to the second surface along the optical axis.

2. The liquid crystal display device according to claim 1, wherein the average angle $\theta$ is not smaller than 50° and not greater than 70°.

3. The liquid crystal display device according to claim 1, wherein an azimuth of the optical axis of the retarder on the first surface adjacent to the back surface is parallel to an azimuth of the optical axis of the retarder on the second surface adjacent to the viewing surface and is perpendicular or parallel to the transmission axis of the viewing-surface-side polarizer.

4. The liquid crystal display device according to claim 1, wherein the retarder contains a cured product of polymerizable liquid crystal.

5. The liquid crystal display device according to claim 1, wherein the viewing-surface-side polarizer is a reflective polarizer.

6. The liquid crystal display device according to claim 1, wherein
an azimuth of the transmission axis of the viewing-surface-side polarizer is 0°±3°, and
an azimuth of the transmission axis of the back-surface-side polarizer is 0°±3°.

7. The liquid crystal display device according to claim 1, wherein
an in-plane retardation of the retarder is not smaller than 5 nm and not greater than 115 nm.

8. The liquid crystal display device according to claim 1, wherein
the retarder includes a cured product of rod-shaped liquid crystal molecules, and
an azimuth of the optical axis corresponds to an azimuth of a major axis of the rod-shaped liquid crystal molecules.

9. A liquid crystal display device comprising:
a polarizing louver that functions as an optical louver including, sequentially from a viewing surface side toward a back surface side, a viewing-surface-side polarizer, a retarder, and a back-surface-side polarizer;
a liquid crystal panel directly on a viewing surface side of the viewing-surface-side polarizer of the polarizing louver; and
a polarizer directly on a viewing surface side of the liquid crystal panel; wherein
the back-surface-side polarizer is a reflective polarizer,
a transmission axis of the viewing-surface-side polarizer and a transmission axis of the back-surface-side polarizer are parallel to each other,
the polarizing louver has an average angle θ between an angle θ1 and an angle θ2 of not smaller than 50° and not greater than 80°,
the angle θ1 is different from greater than the angle θ2,
the angle θ1 represents an angle formed by an optical axis of the retarder on a first surface adjacent to the back surface with the first surface adjacent to the back surface, and the angle θ2 represents an angle formed by an optical axis of the retarder on a second surface adjacent to the viewing surface with the second surface adjacent to the viewing surface,
the optical axis of the retarder on the first surface adjacent to the back surface and the optical axis of the retarder on the second surface adjacent to the viewing surface each have an azimuth of 90°±3°, provided that an azimuth of 0° is set to the horizontally right direction on a screen of the liquid crystal panel and that the azimuths measure positive in a counterclockwise direction and measure negative in a clockwise direction,
each of the optical axes of the retarder on the first surface and on the second surface is inclined from normal directions of the first surface and the second surface, and
each of the azimuths of the optical axes is defined as an azimuth of a direction from a side closer to the first surface to a side closer to the second surface along the optical axis.

10. The liquid crystal display device according to claim 9, wherein
the average angle θ is not smaller than 50° and not greater than 70°.

11. The liquid crystal display device according to claim 9, wherein
a difference between the angle θ1 and the angle θ2 is not smaller than 60° and not greater than 80°.

12. The liquid crystal display device according to claim 9, wherein
an azimuth of the optical axis of the retarder on the first surface adjacent to the back surface is parallel to an azimuth of the optical axis of the retarder on the second surface adjacent to the viewing surface and is perpendicular or parallel to the transmission axis of the viewing-surface-side polarizer.

13. The liquid crystal display device according to claim 9, wherein
the retarder contains a cured product of polymerizable liquid crystal.

14. The liquid crystal display device according to claim 9, wherein
the viewing-surface-side polarizer is a reflective polarizer.

15. The liquid crystal display device according to claim 9, wherein
an azimuth of the transmission axis of the viewing-surface-side polarizer is 0°±3°, and
an azimuth of the transmission axis of the back-surface-side polarizer is 0°±3°.

16. The liquid crystal display device according to claim 9, wherein
an in-plane retardation of the retarder is not smaller than 5 nm and not greater than 115 nm.

17. The liquid crystal display device according to claim 9, wherein
the retarder includes a cured product of rod-shaped liquid crystal molecules, and
an azimuth of the optical axis corresponds to an azimuth of a major axis of the rod-shaped liquid crystal molecules.

* * * * *